US010284695B1

United States Patent
Gejji et al.

(10) Patent No.: US 10,284,695 B1
(45) Date of Patent: May 7, 2019

(54) VOICE-ENABLED MODULAR DEVICES

(71) Applicant: Amazon Technologies, Inc., Seattle, WA (US)

(72) Inventors: Pushkaraksha Gejji, San Jose, CA (US); Prachi Avinash Pant, San Mateo, CA (US); Matthew Carter, San Jose, CA (US); Wilfrido Loor Canizares, San Francisco, CA (US); Jack Shih-Chieh Wei, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/912,331

(22) Filed: Mar. 5, 2018

(51) Int. Cl.
| | |
|---|---|
| *H04N 7/15* | (2006.01) |
| *H04M 1/02* | (2006.01) |
| *G10L 15/22* | (2006.01) |
| *G10L 15/30* | (2013.01) |
| *G06F 1/16* | (2006.01) |
| *G06F 3/16* | (2006.01) |

(52) U.S. Cl.
CPC ........ *H04M 1/0254* (2013.01); *G06F 1/1632* (2013.01); *G06F 3/167* (2013.01); *G10L 15/22* (2013.01); *G10L 15/30* (2013.01); *G10L 2015/223* (2013.01); *G10L 2015/225* (2013.01)

(58) Field of Classification Search
CPC ........................................................ H04N 7/15
See application file for complete search history.

(56) References Cited

U.S. PATENT DOCUMENTS

| | | | |
|---|---|---|---|
| 9,980,076 B1 * | 5/2018 | Pratt ....................... | H04S 7/303 381/26 |
| 2015/0103131 A1 * | 4/2015 | Denoue .................. | H04N 7/147 348/14.03 |

* cited by examiner

*Primary Examiner* — Jerry Wu
(74) *Attorney, Agent, or Firm* — Lee & Hayes, P.C.

(57) ABSTRACT

This disclosure describes voice-enabled modular devices that act as functional, voice-controlled endpoints at which users may provide voice commands. The voice-enabled modular devices may include a power unit which may be installed into a wall permanently to serve as a power source, and a front-panel module which detachably couples to the power unit via a hardware interface. The hardware interface may allow the front-panel module and power unit to communicate with each other, and may further allow the power unit to provide power to the front-panel module. The power unit of the voice-enabled modular device described herein may be configured to provide power to multiple front-panel modules having different capabilities, and potentially different power requirements, thereby supporting multiple front-panel modules to increase the functionality of the voice-enabled modular devices.

19 Claims, 10 Drawing Sheets

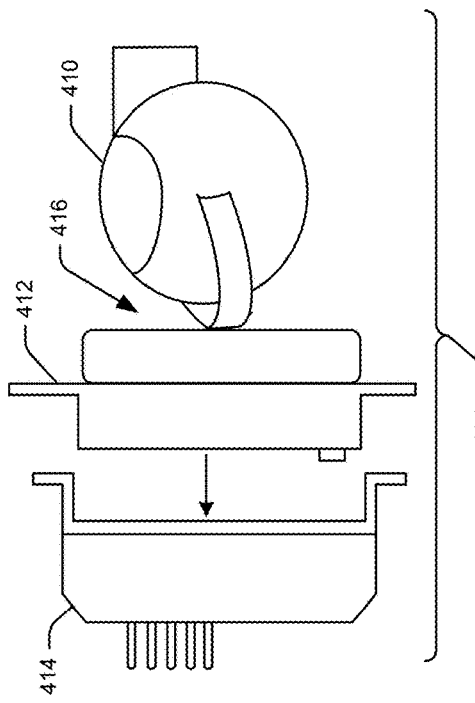
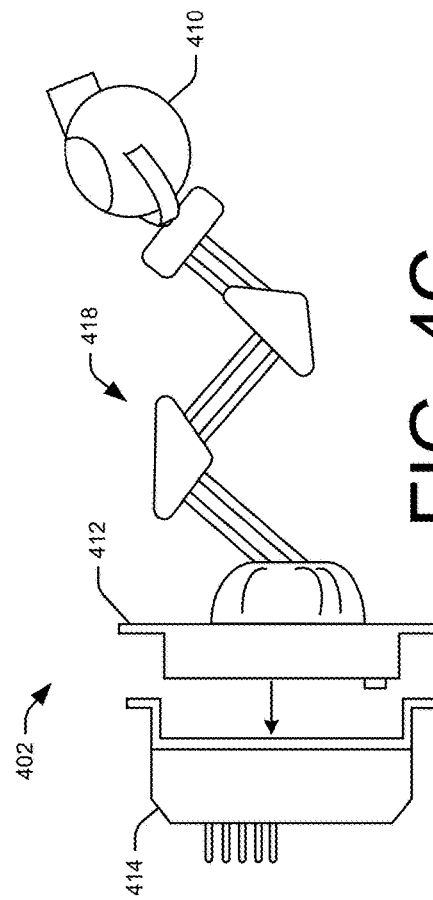
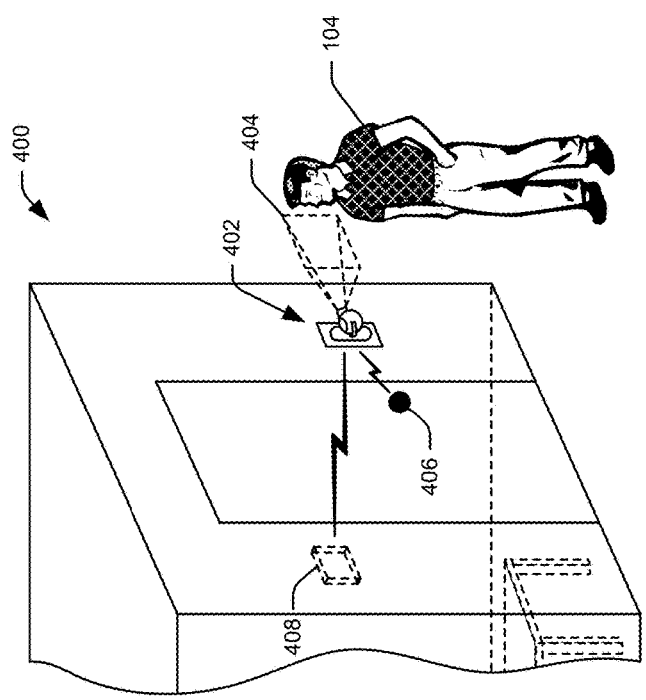
FIG. 4B
FIG. 4C
FIG. 4A

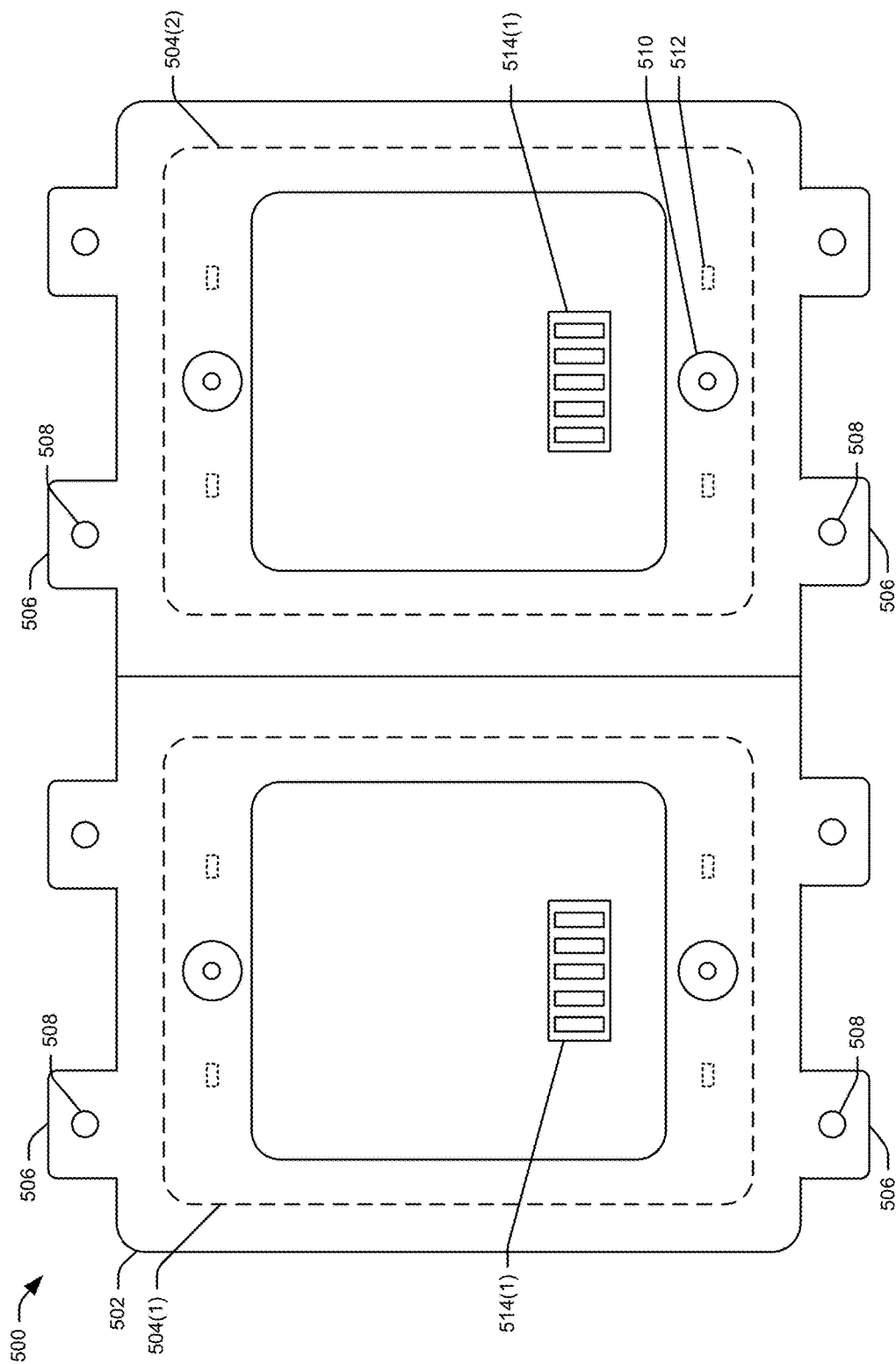

VOICE-ENABLED MODULAR DEVICES

BACKGROUND

Homes are becoming more wired and connected with the proliferation of computing devices such as desktops, tablets, entertainment systems, and portable communication devices. As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of interacting through speech.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2B illustrates another perspective view of an example front-panel module and an example power unit combined to form a voice-enabled modular device where a display of the front-panel module is powered on.

FIG. 4A shows another illustrative voice-interaction computing architecture set in another home environment. The architecture includes a voice-enabled modular device having a camera, where the voice-enabled modular device controls secondary devices physically situated in the home based on identifying a user.

FIG. 4B illustrates a side-view of an example voice-enabled modular device having a camera mounted on the front-panel module of the voice-enabled modular device.

FIG. 4C illustrates a side-view of another example voice-enabled modular device having a camera mounted with a moveable member on the front-panel module of the voice-enabled modular device.

FIG. 5 illustrates an example housing for a multi-gang power unit including multiple power modules.

DETAILED DESCRIPTION

Figure 1:
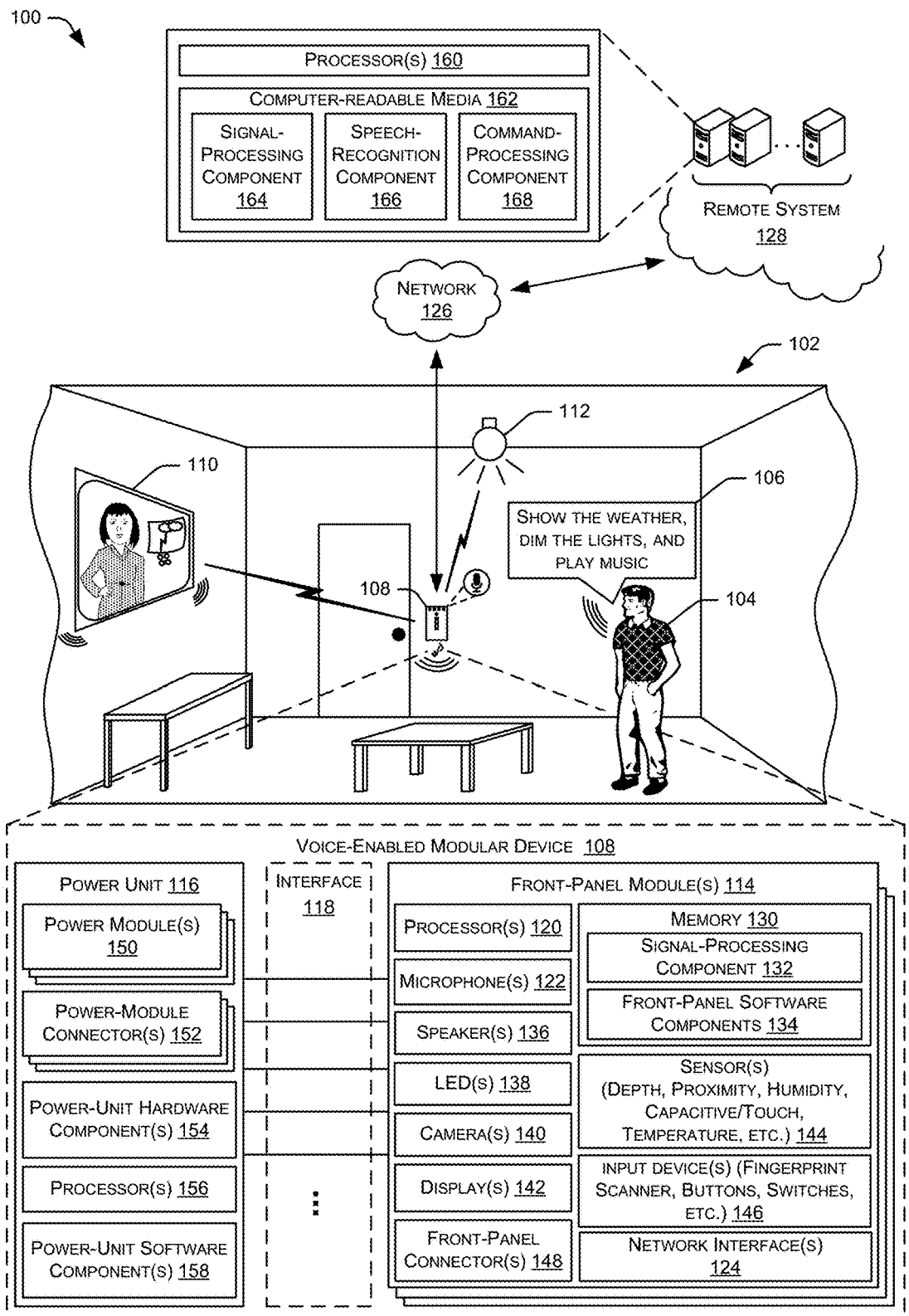
FIG. 1 shows an illustrative voice-interaction computing architecture set in a home environment. The architecture includes at least one voice-enabled modular device controlling secondary devices physically situated in the home, along with a user. In this example, the voice-enabled modular device includes a light switch, and one or more microphones for generating an audio signal that may include a command of the user, such as a command to dim the lights and turn on the television illustrated in the room.

This disclosure describes, in part, voice-enabled modular devices that act as functional, voice-controlled endpoints at which users may provide voice commands. These voice-enabled modular devices may include a power unit, which may be installed into, or mounted onto, a wall permanently to serve as a power source, and a front-panel module which detachably couples to the power unit via a hardware interface. The hardware interface may allow the front-panel module and power unit to communicate with each other, and may further allow the power unit to provide power to the front-panel module. The voice-enabled modular devices described herein include different types and arrangements of front-panel modules, which may have differing functionalities.

As a specific example, a front-panel module described herein may include a physical light switch to selectively provide power to power loads of the voice-enabled modular device, such as appliances (e.g., lights, outlets, home appliances, etc.). In this particular example, the front-panel module may include a light switch to selectively provide power to power loads connected to the power unit of the voice-enabled modular device, such as lights, electrical outlets, home appliances (e.g., dishwashers, washing machines, smoke detectors, security alarms, automated door locks, automated window shades, thermostats, etc.), cleaning devices (e.g., autonomous robotic vacuum cleaners, etc.), or any other device that receives electrical power.

The different types of front-panel modules described herein may additionally, or alternatively, include other components, such as speakers to play audio, cameras to capture image data and video data, displays to present information, sensors to collect data (e.g., depth sensor, proximity sensor, temperature sensor, etc.), wireless-network extenders to re-broadcast a wireless network, and so forth. In various examples, the power unit of the voice-enabled modular device may be configured to supply power to these varying front-panel modules. For instance, the front-panel modules may be detachably or removeably coupled to the power unit to allow swapping of different types of front-panel modules with different capabilities. The power unit may be configured to provide power at different ranges, and/or at different voltages, depending on the requirements of each of the front-panel modules.

In addition to the functionality of components and devices included in or on the different types of front-panel modules, the front-panel modules may further be configured to control various secondary devices in an environment of the voice-enabled modular device. For example, the front-panel modules described herein may include network interfaces (wireless or wired) used to control secondary devices, such as televisions, thermostats, door locks, security systems, and so forth. As an example, a front-panel module may include a temperature sensor that detects the temperature in the room of the voice-enabled modular device. The front-panel module may include thermostat functionality, or be communicatively coupled to a thermostat, to control heating systems and/or cooling systems for the environment. For instance, if the front-panel module utilizes the temperature sensor to determine that the temperature of the environment is too low, or too high, compared to a temperature set by a user, the front-panel module may activate or deactivate cooling systems and/or heating systems for the environment.

In additional to the functionality provided by the components installed in or on the front-panel modules, the voice-enabled modular devices may further include one or more microphones for generating audio signals, from which one or more speech commands may be identified. For instance, a front-panel module may include a microphone for generating audio signals based on sound detected within the environment of the voice-enabled modular device. The front-panel module may perform speech recognition on the generated audio signal to identify a speech command, and perform an operation based on that command. For instance, the front-panel module may perform speech recognition to determine that a user issued a speech command to "please turn on the TV," and the front-panel module may generate and send a command to a television (or television controller) to turn on the television.

However, in some examples the front-panel modules may have relatively low functionality in terms of speech processing. For instance, the voice-enabled modular devices may be configured to merely serve as an interface or "middle man" between a remote system and a user. In this way, the more intensive processing involved in the speech-processing techniques may be performed using large amounts of resources of remote systems. While the voice-enabled modular devices may be configured with components for performing pre-processing on an audio signal representing a speech utterance, such as beamforming and wake word detection, the voice-enabled modular devices may relay the audio signals to a speech-processing system which performs processing techniques on the audio signals to determine a command from the speech of the user. Thus, some or all of the speech-processing techniques described herein may be performed by a speech-processing system (e.g., "cloud-based system," "software-as-a-service (SaaS)," "network-accessible platform," "remote system," etc.) which receives data from the voice-enabled modular devices. Each of the voice-enabled modular devices may access the remote speech-processing system through a communications network, such as the Internet, to provide the speech-processing system with the captured audio signal.

In addition to swapping front-panel modules by detaching a front-panel module from a power unit to allow a new front-panel module to be detachably coupled to the power unit, the techniques described herein include a power unit capable of supporting power for multiple front-panel modules. For instance, the power unit may be capable of providing power at a fixed voltage (e.g., 120 volts (V), 240V, etc.) to a base front-panel module, as well as various add-on front-panel modules with different capabilities or functionalities (e.g., different input and/or output devices). Further, the power unit may be capability of providing power at different voltages for the different front-panel modules (e.g., 120 volts, 20 volts, 5 volts, etc.), and in different formats (e.g., direct current (DC), alternating current (AC), etc.). For instance, the power unit may include multiple power modules which are configured to supply power to different front-panel modules at different voltages, or otherwise in a different format.

The power units described herein may include multiple power modules, or otherwise be configured with hardware, to provide multiple front-panel modules with power. Rather than swapping front-panel modules with each other based on a desired front-panel module functionality, the power unit may support multiple front-panel modules at a time. In some examples, the power unit may include multiple attachment mechanisms to support the weight and positioning of the multiple front-panel modules. In other examples, a front-panel module may serve as a "base" or "primary" front-panel module onto which other front-panel module add-ons may be detachably coupled. For instance, a base front-panel module may input attachment mechanisms, as well as communication interfaces (e.g., USB, UART, etc.) to communicate with the add-on panel, provide mechanical support for the add-on panel, and potentially to provide power for the add-on panel from the power unit. Further, the base front-panel module may provide commands to or otherwise control relatively "simple" front-panel module add-ons. For instance, some front-panel module add-ons may simply include sensors (e.g., temperature sensors, depth sensors, etc.) to increase the functionality of the base front-panel module. As an example, a front-panel module may include one or more light emitting diodes (LEDs), and an additional front-panel module that includes a motion sensor may be detachably coupled to the base front-panel module and or the front power unit. By collecting motion data from the added motion sensor module, the base front-panel module may provide users of the voice-enabled modular devices with motion-activated lights in their house.

Thus, the techniques described herein include the use of power units capable of providing power to various front-panel modules at a same time, and the use of front-panel modules having differing functionalities that are capable of communicating with each other. In this way, multiple front-panel modules may be supported as a single voice-enabled modular device, thereby increasing the functionality of the voice-enabled modular device at a single location in a house of a user. This "grid-like" formation of front-panel modules that have varying functionality may enable a user to create voice-enabled modular devices that, when utilizing the different functions of the multiple front-panel modules, provides the user with more useful voice-enabled modular devices.

As an example, a base front-panel module may include one or more microphones for generating an audio signal representing speech of a user, and one or more speakers for outputting audio data, such as audio data generated by the remote speech-processing service for responding to commands or questions of the user included in the speech. Further, the base front-panel module may include network interfaces for communicating over various types of networks (e.g., wide-area networks such as the Internet), which enables the base front-panel module to stream audio data, such as music, and output the streaming music on the speakers of the base front-panel module. According to the techniques described herein, a user may install or couple additional front-panel modules to the base front-panel module and/or the power unit to provide additional functionality to the voice-enabled modular device. For example, a user may install one or more additional front-panel modules to enable video conferencing with the voice-enabled modular device. For instance, the user may install a front-panel module add-on that has a camera for capturing video data. The base front-panel module may receive the video data over a communication interface from the add-on front-panel module having the camera, and send that video data over a network to a remote computing device of another user to provide video conferencing. Further, another front-panel module that has a display may be added onto the voice-enabled modular device to present video data received from the remote computing device of the other user to further enhance the video conferencing of the voice-enabled modular device.

Due to the amount of power being supplied to the different front-panel modules, and the ability to decouple the front-panel modules from the power unit, the front-panel modules may be electrically isolated using one or more isolation devices. For instance, various components of the power unit exposed by the hardware interface may be electrically isolated using at least one of magnetic isolation or optical isolation. This may further provide a "safe" power unit to prevent potential harmful shock when a front-panel module is not connected to the power unit.

Further, to prevent harmful/dangerous front-panel modules from being installed onto a power unit, the techniques described herein include an authentication scheme that is implemented upon installation or coupling of a front-panel module to the power unit. The power unit and front-panel module may utilize an authentication scheme, which may include encryption/decryption of data using a digital signature algorithm (DSA), to authenticate a newly installed front-panel module as being safe or recognized by the power unit.

In addition to the functionality provided by the various components of the front-panel modules, the voice-enabled modular devices may also be utilized for other purposes. For example, various commands may be communicated between the front-panel module and the remote speech-processing system, such as a command to add an item to a shopping list of a user, add a calendar appointment to a calendar of a user, record a television show for a user, etc. In such examples, the front-panel module may receive the commands, such as by capturing a speech command using a microphone, and communicate audio signals representing the speech commands to the remote speech-processing system using the techniques described herein. The remote speech-processing systems may then perform operations on behalf of the voice-enabled modular devices to perform the commands issued by the user (e.g., obtaining a URL for streaming music by the voice-enabled modular device, adding an item to a shopping cart of a user of the voice-enabled modular device, recording a television show for the user, etc.).

Thus, the techniques described herein include voice-enabled modular devices having power units which are capable of providing power to multiple front-panel modules with differing capabilities to create voice-enabled modular devices with grids, or other formations, of front-panel modules. The techniques described herein increase the functionality and capabilities of voice-enabled modular devices by including power units capable of providing power such that the front-panel modules attached to the power units are scalable in number and functionality. Further, these multi-functional, scalable, voice-enabled modular devices may also function as speech endpoints for users to issue speech commands to for causing the front-panel modules and/or power unit to perform operations, or for causing the remote speech-processing system to perform operations on behalf of the user.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative voice-interaction computing architecture 100 set in a home environment 102 that includes a user 104 issuing a voice command 106 to at least one voice-enabled modular device 108. The architecture 100 illustrates the voice-enabled modular device 108 controlling secondary devices, such as a television 110 and a light 112, physically situated in the home environment 102, along with the user 104. In this illustrated example, the voice-enabled modular device 108 includes a light switch, and one or more microphones for generating an audio signal that may include a command of the user 104, such as a command to show the weather on the television 110, dim the lights 112, and play music using a speaker of the voice-enabled device 108 illustrated in the room.

The voice-enabled modular device 108 may include one or more front-panel modules 114, a power unit 116, and an interface 118 to facilitate communication between the front-panel module(s) 114 and the power unit 116. The front-panel module(s) 114 may further include one or more processors 120 to power operations and components of the front-panel module(s) 114, and one or more microphones 122 that may generate one or more audio signals for identifying the voice command 106 and performing a corresponding action, such changing the brightness of a light 112 within the environment 102.

In some instances, the front-panel module(s) 114 may identify a predefined word or phrase ("wake up") and may thereafter begin streaming, using one or more network interface(s) 124 and over a network 126, one or more audio signals to another device for processing, such as to a remote system 128 comprising one or more remote devices (or "computing resources"). These remote computing resources may form a portion of a network-accessible computing platform implemented as a computing infrastructure of processors, storage, software, data access, and so forth that is maintained and accessible via a network such as the Internet. The remote computing resources do not require end-user knowledge of the physical location and configuration of the system that delivers the services. Common expressions associated for these remote computing devices include "on-demand computing", "software as a service (SaaS)", "platform computing", "network-accessible platform", "cloud services", "data centers", and so forth. Further, while FIG. 1 illustrates the remote system 128 as being accessible over a network, in other instances the remote system/device may comprise a local hub within an environment of the voice-enabled modular device 108.

The remote system 128 may perform processing on these audio signals (e.g., beamforming, acoustic echo cancellation, etc.) as well as speech recognition to identify one or more voice commands, such as the voice command 106 to dim the lights 112. After identifying the voice command 106, the remote system 128 may send an instruction to the voice-enabled modular device 108, or to another device (in the environment 102 or otherwise), to perform a corresponding action. In this example, the remote system 128 may send an instruction to the voice-enabled modular device 108 to dim the light 112, show the weather on the television 110, and play music using a speaker of the voice-enabled modular device 108. In response to receiving this instruction, the voice-enabled modular device 108 may execute the instruction and show weather on the television 110, dim the light 112, and play the music. In some examples, the voice-enabled modular device 108 may cause circuitry and/or software modules of the device 108 to provide less power to the lights 112 connected to the switch than previously being provided, without a dimmer switch moving positions (as in the case of a user manually adjusting the dimmer switch). Instead, the internal circuitry and/or software modules may change a duty cycle of a power signal being provided to the light 112 to cause the light 112 to dim. In other examples, the internal circuitry and/or software modules may cause the duty cycle of a power signal to change to increase the power supply to the lights 112, and thus increase the brightness of the lights 112.

In the example described above, the voice-enabled modular device 108 may communicate with the remote system 128 over one or more networks 126, which may comprise wired technologies (e.g., wires, USB, fiber optic cable, etc.), wireless technologies (e.g., WiFi, RF, cellular, satellite, Bluetooth, etc.), or other connection technologies. The network 126 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. In some instances, the voice-enabled modular device 108 may also communicate with user devices via short-range wireless communication protocols (e.g., Bluetooth, Zigbee, etc.), such as the television 110. In still other instances, the voice-enabled modular device 108 may communicate with local user devices to send instructions to these devices. For instance, if the user 104 states a command to "turn on my kitchen television", the voice-enabled modular device 108 may send an instruction to do so to the kitchen television using the appropriate protocol used by the television.

As illustrated, the voice-enabled modular device 108 may include the front-panel module(s) 114, the power unit 116, and the interface 118 to facilitate communications between the front-panel module(s) 114 and the power unit 116. The front-panel module(s) 114 may include the microphone(s) 122 and memory 130 storing a signal-processing component 132 and front-panel software components 134. As discussed in more detail below, the signal-processing component 132 may be configured to perform various acoustic processing techniques on audio signals generated by the microphone(s) 122, and the front-panel software components 134 may cause the processor(s) 120 to perform various operations of the front-panel module(s) 114, such as authenticating the front-panel module(s) 114 with the power unit 116, communicating with other devices, determining commands to perform based on voice commands 106 of the user 104, and so forth.

According to the techniques described herein, the power unit 116 may provide power to various types, and various numbers, of front-panel module(s) 114 over the interface 118. Thus, the front-panel module(s) 114 may include one, or multiple, front-panel module(s) 114. Further, the individual, or multiple, front-panel module(s) 114 may each include various components. For example, the front-panel module(s) 114 may include at least one of microphone(s) 122, one or more speakers 136 to output audio data, one or more light emitting diodes (LEDs) 138 to output light, one or more cameras 140 to capture image data and/or video data, one or more displays 142 to present image data or video data, one or more sensors 144 to collect data (e.g., depth sensors, proximity sensors, humidity sensors, capacitive/touch sensors, temperature sensors, etc.), and one or more input devices 146 (e.g., fingerprint scanners, mechanical buttons, mechanical switches, etc.).

In some examples, a single front-panel module 114 may be detachably coupled to the power unit 116, and include one, or multiple, of the various components described above. For instance, a single front-panel module 114 may be coupled to the power unit 116, and the single front-panel module 114 may include components to voice-enable the device 108, such as the microphone(s) 122 to capture the voice command 106, and potentially network interface(s) 124 to send audio signals representing the voice command 106 to the remote system 128. In other examples, the front-panel module 114 may include any of the other components illustrated.

In various examples, a single front-panel module 114 may serve as a "base" module that is connected to the power unit 116. For instance, the front-panel module 114 may be connected to the power unit 116 by front-panel connector(s) 148, which may comprise any type of connector (e.g., snap-fit connectors, drop connectors, magnetic connectors, spring latch connectors, cantilever connectors, hook and loop connectors, sleeve connectors, etc.). The power unit 116 may include one or more power module(s) 150 which supply power to the front-panel module 114, and one or more power-unit connector(s) 152 which serve as electrical interfaces by which the power module(s) 150 provide power to the front-panel module 114.

In some examples, the voice-enabled modular device 108 may include multiple front-panel modules 114. The multiple front-panel modules 114 may be arranged in different configurations. For instance, a base front-panel module 114 may be coupled to the power unit 116, and one or more additional front-panel modules 114 may be detachably coupled to the base front-panel module 114. For instance, the base front-panel module 114 may include various communication ports (e.g., USB, UART, etc.) to communicate with additional front-panel modules 114.

In some examples, the base front-panel module 114 may provide a conduit (e.g., electrical wiring) by which power is provided from the power unit 116 to the additional front-panel modules 114 coupled to the base front-panel module 114. However, in various examples, the additional front-panel modules 114 may be detachably coupled to the power unit 116 themselves, in addition to being communicatively coupled to the base front-panel module 114. For example, each of the front-panel modules 114 may be mechanically coupled to the power unit 116 for structural support, and may further be electrically coupled to the power unit 116 to communicate with the power unit 116 and to receive power from the power unit 116. In some examples, the multiple front-panel modules 114 may be coupled to respective power modules 150 using respective power-module connectors 152 to receive power from the power unit 116. The power modules 150 may provide power at a same voltage and in a same form (e.g., AC, DC, etc.) to the respective front-panel modules 114, while in other examples, the one or more of the power modules 150 may provide power at different voltages and/or in different forms. For example, one power module 150 may provide power to a front-panel module 114 at one voltage (e.g., 5V DC), and another power module 150 may provide power to a different front-panel module 114 at a different voltage (e.g., 120 VAC). In this way, front-panel modules 114 having different components, and potentially different power/voltage requirements, may receive power from a same power unit 116. Thus, the voice-enabled modular device 108 may include multiple front-panel modules 114 with different functionality and/or components in order to provide a multi-functional voice-enabled modular device 108 at a single location in an environment 102.

As a specific example, a first front-panel module 114 may be connected to a first power module 150 of the power unit 116 to receive first power at a first voltage. The first front-panel module 114 may serve as a base front-panel module 114 and include at least microphone(s) 122 and network interface(s) 124 to enable speech processing. A second front-panel module 114 may be coupled to the power unit 116 and connected to a second power module 150 of the power unit 116 to receive second power at a second voltage. The second front-panel module 114 may comprise a display 142 to present video data, and may further include a camera 140 to capture image data or video data. The first front-panel module 114 (or the second front-panel module 114) may stream video data and/or audio data using the network interfaces 124 from a remote user device, output the audio data using speakers 136 of at least one of the first or second front-panel modules 114, and communicate the image/video data to the second front-panel module 114 to be output on the display 142. Further, the second front-panel module 114 may capture video data using the camera 140, and communicate the video data to the first front-panel module 114 to be streamed to the remote user device using the network interfaces 124. In this way, a combination of two front-panel modules 114 may be used to facilitate a video-conference with a remote user device.

In some examples, an add-on front-panel module 114 that is coupled to a base front-panel module 114 may be relatively unsophisticated. For instance, the add-on front-panel module 114 may rely on components of the base front-panel module 114, such as the processor(s) 120, microphone(s) 122, the network interface(s) 124, the front-panel software components 134, and so forth. For instance, an add-on front-panel module 114 may simply include a component, such as a sensor 144, that is operated or controlled by the base front-panel module 114.

In some examples, each of the front-panel modules 114 may include any or all of the components shown in FIG. 1. However, in other examples, a base front-panel module 114 may be designated, or serve, as a source front-panel module 114. For instance, a base front-panel module 114 may include microphones 122 to capture voice commands 106, and network interfaces 124, while additional front-panel modules 114 may not include such components. In further examples, all of the front-panel module 114 coupled to the power unit 116 may include microphones 122 and network interfaces 124, but may designate one of the front-panel modules 114 to communicate data using the network interface(s) 124. However, any combination of front-panel modules 114 may be connected to the power unit 116, and each of the front-panel modules 114 in the combination may include any of the components illustrated in FIG. 1.

As illustrated, the power unit 116 may include power-unit hardware component(s) 154, such as mechanisms to detachably couple front-panel modules 114 to the power unit, a housing for the power unit 116, etc. Further, the power unit may include one or more processors 156 to power components of the power unit 116, such as the power-unit software components 158. The power-unit software component(s) 158 may perform various operations, such as encrypting and/or decrypting data set and received between the power unit 116 and the front-panel module(s) 114. The power-unit software component(s) 158 may decrypt/encrypt data sent and received with the front-panel module(s) 114 and determine that the data includes the instruction or command to perform an operation. For example, the power power-unit software component(s) 158 may cause the power-unit hardware components 154 to change the brightness of a light 112 that is controlled by the power unit 116 through an electrical connection (e.g., as a load).

In some examples, the power-unit hardware components 154 may include circuitry, integrated circuits, and other hardware for performing various power control operations. For instance, the power-unit hardware components 154 may adjust the duty cycle of a power signal for the light 112 to change the brightness of the light 112. In various examples, the power-unit hardware components 154 may provide power to the components of the front-panel module(s) 114. In some instances, the processors 156, power-unit hardware components 154, and/or the power-unit software components 158 may comprise a microprocessor chip.

The power unit 116 of the voice-enabled modular device 108 may be permanently installed at a location, such as a wall of a home or other building shown in FIG. 1. The power unit 116 of the voice-enabled modular device 108 may receive power from a persistent power source, such as the primary alternating current (AC) power supply connected to the home or other building. The power unit 116 may convert the AC power received to direct current (DC) power, and step down the voltage to provide power to a front-panel module 114. As such, this power unit 116 may be used to power the microphone(s) 122 and other components of a front-panel module 114. Further, while the power unit 116 may couple to an AC power supply, in other instances the power unit 116 may couple to any other type of power source, such as batteries, capacitors, solar panels, or the like.

The interface 118 may generally comprise one or more female connections disposed on either the power unit 116 or the front-panel module(s) 114, and one or more male connections disposed on the other of the power unit 116 or the front-panel module(s) 114. The male connections and female connections mate to create electrical connections between the power unit 116 and front-panel module(s) 114. In some examples, the interface 118 may include at least two connections for communicating data using the I2C protocol between the power unit 116 and the front-panel module(s) 114. However, as noted above, the interface 118 may include any number of connections for communicating using any protocol. Further, the interface 118 may include a connection for providing power from the power unit to the front-panel module(s) 114. In some examples, the interface 124 may include other connections as described further below.

As noted above, the signal-processing component 132 may perform various processing techniques, such as acoustic processing techniques, on audio signals or audio data generated by the microphone(s) 122 of the front-panel module 114. For example, the signal-processing component 132 may perform noise cancellation, echo cancellation, beamforming, or any other type of processing on the audio signals. Further, the signal-processing component 132 may identify a predefined word or phrase ("wake up") and may thereafter begin streaming, using one or more network interface(s) 124 and over a network 126, one or more audio signals to another device for processing, such as to the remote system 128 comprising one or more remote devices (or "computing resources").

In some instances, the front-panel module 114 or other client devices within the environment 102 may upload audio signals to the remote system 128 for processing, given that the remote system 128 may have a computational capacity that far exceeds the computational capacity of the front-panel module 114. The remote system 128 may include one or more processors 160 configured to power operations performed by various components stored in computer-readable media 162 of the remote system 128. Generally, the processor(s) 160 and components stored on the computer-readable media 162 may be stored in a same computing device, or on separate computing devices or servers.

Upon receiving audio signals from the front-panel module 114, a signal-processing component 164 stored on the computer-readable media 162 may perform one or more relatively complex processing techniques on the signals to generate one or more processed audio signals. For instance, the signal-processing component 164 may perform beamforming, acoustic-echo cancellation, background noise reduction, or other techniques to generate one or more processed audio signals having a higher SNR than the pre-processed audio signals. Furthermore, the front-panel module 114 may additionally or alternatively include all or portions of the signal-processing component 164 for performing the beamforming, acoustic-echo cancellation, background noise reduction, or other techniques prior to uploading the processed audio signals to the remote system 128.

Thereafter, a speech-recognition component 166 stored in the computer-readable media 162 may perform speech-recognition on the processed audio signal(s) to identify one or more voice commands represented therein, such as the example voice command 106. For instance, the speech-recognition component 166 may convert the audio signals into text data using automatic-speech recognition (ASR), and determine an intent for voice commands 106 of the user using natural-language understanding (NLU) on the text data. Thereafter, a command-processing component 168, stored in the computer-readable media 162, may cause performance of one or more action in response to identifying an intent of the voice command. In the illustrated example, for instance, the command-processing component 168 may issue an instruction to the front-panel module 114, which in turn sends an instruction to an appropriate device. For instance, the command-processing component 168 may issue one or more instructions to the front-panel module 114, which in turn sends an instruction to the television 110 to show the weather channel, sends an instruction to at least one of the power unit 116 or the light 122 to dim the light 112, and outputs music using a speaker 136 of one or more connected front-panel modules 108.

Given the above, in some instances the front-panel module 114 transitions from an "asleep" state, in which the local speech-processing component 132 performs ASR to identify a predefined utterance, to an "awake" state, in which the front-panel module 114 provides audio signals to the remote system 128 for processing and performing ASR thereon. In other instances, meanwhile, the front-panel module 114 may include a selectable physical button or soft button that causes the front-panel module 114 to transition from the "asleep" state to the "awake" state in response to a user selecting the button.

Furthermore, regardless of whether the speech recognition occurs locally or remotely from the environment 102, the front-panel module 114 may receive vocal input from the user 104 and the front-panel module 114 and/or the remote system 128 may perform speech recognition to interpret a user's operational request or command. The requests may be for essentially any type of operation, such as changing the brightness of the light 112, turning on or off appliances, adjusting appliance settings, authentication, database inquires, requesting and consuming entertainment (e.g., gaming, finding and playing music, movies or other content, etc.), personal information management (e.g., calendaring, note taking, etc.), online shopping, financial transactions, and so forth.

Thus, in some examples, the front-panel module 114 may receive, from the remote system 128, data indicating that the one or more audio signals include a request (e.g., sound, speech input, etc.) from the user 104 to perform an operation, such as change an amount of power supplied to a power load connected to the power unit 116 (e.g., light 112), turn the television 110 to the weather channel, etc.

In other examples, rather than receiving a voice request from the user 104 to perform an operation, such as increase or decrease the brightness of the light 112, the front-panel module 114 may receive input via an input device 146, such as a switch, to change the brightness of the light 112. Regardless of the type of input, the memory 130 of the front-panel module 114 may include the front-panel software components 134 configured to send a command to the power unit 116, or an appropriate secondary device (e.g., television 110, light 12, etc.) upon receiving input instructing the front-panel module 114 to perform an operation, such as dim the light 112.

Figure 2A:
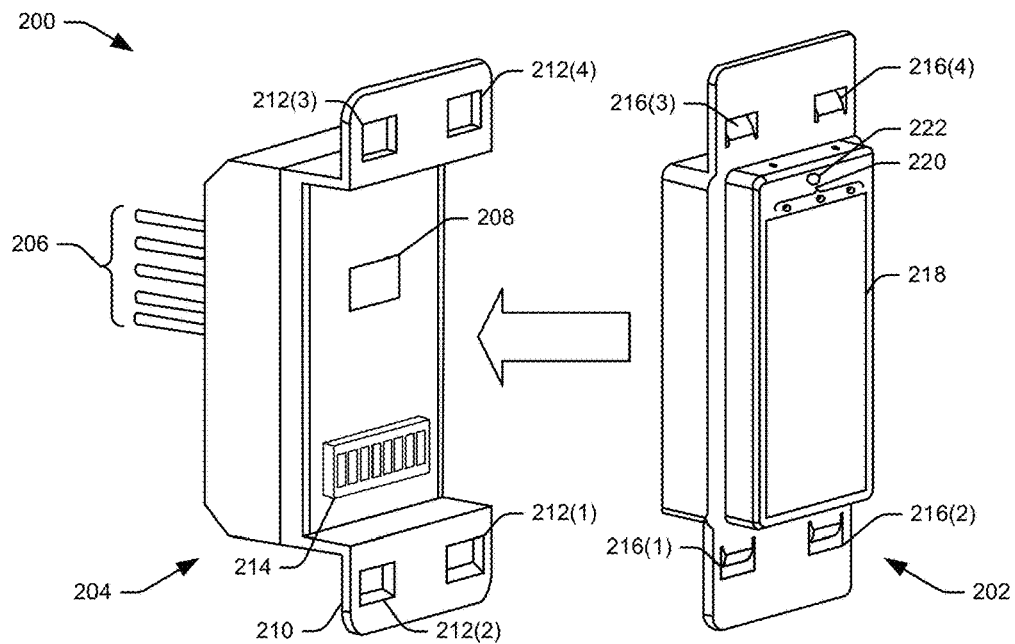
FIG. 2A illustrates a perspective view of an example front-panel module and an example power unit of a voice-enabled modular device, where the front-panel module includes a display.

FIG. 2A illustrates a perspective view of an example voice-enabled modular device 200 (e.g., voice-enabled modular device 108), including a front-panel module 202 (e.g., front-panel module 114) and an example power unit 204 (e.g., power unit 116), where the front-panel module 202 includes a display.

As discussed above, the power unit 204 may be configured to receive power, such as via one or more wires 206, convert the electrical power to a format compatible with the front-panel module 202 (e.g., AC to DC conversion, such as 110V to 9V conversion, 220V to 9V conversion, etc.), and transmit power to the front-panel module 202.

In various examples, the power unit 204 may comprise a form factor configured to fit in a standard electrical junction box. In such examples, the power unit 204 may comprise a height, width, and/or depth to house within a junction box. In various examples, the power unit 204 may be sized to fit within a single gang, double gang, or multiple gang junction box. In some examples, the power unit 204 may include multiple power modules and may fit in a double gang or multiple gang junction box.

The power unit 204 may be configured to couple to one or more wires 206 for receiving power (e.g., connect to a power source) via a terminal. In various examples, the wires 206 may include one or more electrical wires (e.g., hot, ground, load, neutral). In some examples, the wires 206 may also be used to transmit data (e.g., in the case of power line communication or PLC). The power unit 204 may include a relay for on/off functionality. For instance, the power unit 206 may include a disconnect switch 208 (e.g., a kill switch), where the disconnect switch 208 comprises a mechanical device to selectively provide power to, and/or communication with, the front-panel module 202 based on the front-panel module 202 being fit into the power unit 204. For example, the front-panel module 202 may compress the disconnect switch 208 upon being coupled to the power unit 204, and the disconnect switch 208 may be compressed.

When the disconnect switch 208 is compressed, the power unit 204 may begin providing power to the front-panel module 202. For instance, the disconnect switch 208 may complete a circuit internal to the power unit 204 when the front-panel module 202 is connected, which may help with safety when coupling and decoupling the front-panel module 202 to the power unit 116. When the front-panel module 202 is decoupled from the power unit 116, the disconnect switch 208 may open the circuit internal to the power unit 204 such that the power unit 204 is no longer providing power, or does not have any "hot" ends.

In various examples, the power unit 204 may be mounted in a wall, such as in the wall of home environment 102. In such examples, the power unit 204 may be inset into the wall such that a back side of a face plate 210 (e.g., casing) is substantially flush against a surface of the wall. The face plate 210 may comprise a metal material (e.g., zinc, aluminum, steel, etc.), a plastic material, a composite material (e.g., fiberglass, carbon fiber, etc.), and/or a combination thereof.

In various examples, the power unit 204 may be configured to couple to the front-panel module 202 via a mechanical interlock and/or mechanical connection between the power unit 204 and the front-panel module 202. For instance, the power unit 204 may include connection points 214 (e.g., 214(1), 214(2), 214(3), and 214(4)) to couple the power unit 204 to the front-panel module 202. In the illustrative example, the connection points 214 include a drop connection points, but in other examples, any other type of connectors or attaching mechanisms may be used, such as snap-fit connectors, magnetic connectors, fasteners, spring latch connectors, cantilever connectors, hook and loop connectors, sleeve connectors, or the like.

In some examples, the power unit 204 may include components for providing wireless charging, or providing of power, to the front-panel module 202 (and other front-panel modules). For instance, if the front-panel module 202 is brought within proximity to the power unit 204, the power unit 204 may perform wireless charging (e.g., inductive charging, cordless charging, etc.) by using an electromagnetic field to transfer energy to the front-panel module 202. In some examples, the energy may be passed from the power unit 204 using electromagnetic induction via an inductive coupling with the front-panel module 202, and in some examples, additional front-panel modules or devices. Thus, as described herein, providing power from the power unit 204 may include wired and/or wireless charging of any form.

Additionally, or alternatively, the power unit 204 may be configured to couple to the front-panel module 202 via an electrical and/or hardware interface 214, such as interface 118. In various examples, the interface 214 may be an electro-mechanical connector. As illustrated, the interface 214 includes 8 pins for electrical power and/or data transfer to the front-panel module 202. In other examples, the interface 214 may include a greater or lesser number of pins or connections.

The front-panel module 202 may similarly include connection points 216 (e.g., 216(1), 216(2), 216(3), and 216(4)) to align with the connection points 212 of the power unit 204 to couple the front-panel module 202 with the power unit 200. The connection points 216 may comprise any type of attachment mechanism to detachably couple the front-panel module 202 to the power unit 204.

Thus, the front-panel module 202 may be detachably coupled to the power unit 204, and together the units may comprise the voice-enabled modular device 200. In various examples, the power unit 204 may be a universal power unit configured to couple to multiple different front-panel modules 202. In such examples, each power unit 204 in a home may include substantially the same features, and a user 104 may select different front-panel modules 202 to couple to a particular power unit 204, based on a location associated therewith. For example, a user who enjoys watching the news while making breakfast may mount a front-panel module 202 with a display 218 configured to present information on a power unit 204 mounted in a kitchen.

In various examples, the voice-enabled modular device 200 may be communicatively coupled to one or more other voice-enabled modular devices 200 in the home environment via a wired and/or wireless connection. In such examples, the voice-enabled modular devices 200 may be used as one or two-way communication devices, such as an intercom system. For example, a user may issue a voice command to a voice-enabled modular device 200 in the kitchen to activate an intercom functionality with a voice-enabled modular device 200 in a child's bedroom. The user may then transmit an audio signal to a voice-enabled modular device 200 in the child's room telling a child to wake up.

As illustrated, a single power unit 204 is configured to couple to a single front-panel module 202. In other examples, a single power unit 204 may be configured to couple to two or more front-panel modules 202. In various examples, the power unit 204 may comprise multiple power modules, where each of the power modules is configured to power and/or couple to a different front-panel module 202.

As shown, the front-panel module 202 may include the display 218 for presenting information. The display can be a light-emitting diode (LED) display, an organic light-emitting diode (OLED) display, an active-matrix OLED display, a liquid crystal (LCD) display, a thin film transistor (TFT) display, a thin film diode (TFD) display, color super twisted nematic (CSTN) display, a quantum dot display, carbon nanotubes, or any other type of display. In various examples, the display may be configured to receive touch input, such as through a capacitive touchscreen or a resistive touchscreen.

However, in other examples, the front-panel module 202 may include any of the components described in FIG. 1 for the front-panel module(s) 114. The front-panel module 202 may include one or more antennae configured to transmit and receive signals over a network, such as network 126. The signals may include audio and/or visual data corresponding to commands processed via the front-panel module 202. The signals may also include data signals comprising instructions for a device (internal or external to the front-panel module 202) to perform an operation, such as to turn on a light or play music.

The front-panel module 202 may include various components to assist in the human interaction functionality, such as one or more microphones 220, and/or one or more sensors 222. In the illustrative example, front-panel module 202 includes a microphone array 220 with three microphones located on a top portion of a front-panel module 202. In other examples, the microphone array 220 may include a greater or lesser number of microphones in a similar pattern (e.g., two rows of microphones, three rows of microphones, etc.) and/or different pattern (e.g., microphones situated in a circular pattern on a surface, offset and/or alternating rows of microphones, etc.). However, any number of microphones 220 may be positioned at any location on the front-panel module 202. In various examples, the microphone array 220 may be inset into the front-panel module 202, and the front-panel module 202 may include an opening for audio waves to travel to the inset microphone array 220.

As discussed above, the microphone array 220 may be configured to receive voice commands, such as voice command 106, from a user 104. In various examples, the microphone array 220 may be configured to recognize one or more keywords (e.g., a wake word, wake phrase) from the user. In such examples, the microphone array 220 may filter out noises detected that are not preceded by the one or more keywords. The one or more keywords may be predefined. In some examples, the one or more keywords may be user specific. In such examples, the predefined keywords may be stored in a user profile on a data store in the front-panel module 202. In some examples, the verbs may be predefined, based on capabilities of the voice-enabled modular device 200 and/or secondary devices in communicatively coupled to the device 200.

In various examples, the front-panel module 202 may include one or more sensors 222 to capture various data. For example, the sensors 222 may include a temperature sensor to collect temperature data, a depth sensor to detect a gesture and/or a presence of the user, a motion sensor (e.g., passive infrared (PIR) sensor, etc.), a thermal sensor (e.g., forward looking infrared (FLIR) sensor, etc.), an air sensor (e.g., $CO_2$ detector, etc.), and/or other sensors to detect visual input (e.g., gestures, presence, etc.). In some examples, the one or more sensors 222 may include multiple of any of the foregoing sensors or other sensors. In various examples, the front-panel module 202 may be programmed to cause one or more devices to perform one or more actions based on a physical presence in a room in which the modular controller is located. In such examples, the one or more sensors 222 may detect the physical presence, and may send a signal corresponding to the presence to a local and/or remote computing device to cause the one or more actions to be performed. In some examples, the computing system of the front-panel module 202 may be configured to automatically (e.g., without processing the presence signal to determine an interpretation of a command) cause the one or more actions to be performed based on detection of the physical presence. For example, the front-panel module 202 located in a hospital waiting room may be programmed to automatically turn on a light and play music when people are in the waiting room. Based on a detection of a person in the waiting room, the front-panel module 202 may automatically cause a light to turn on and/or may cause a speaker to play music.

In various examples, the sensors 222 may be configured to identify one or more gestures (e.g., predefined gestures) associated with one or more commands. The sensors 222 may capture one or more images of a user in the environment. In some examples, the user must be within a predefined distance (e.g., 1 ft., 2 ft., 1 yd., etc.) of the front-panel module 202 to activate the sensors 222. The sensors 222 may send a signal associated with the gesture to a local and/or remote computing system for processing. The local and/or remote computing system may process the signal and interpret the command associated therewith. The local and/or remote computing device may then send an instruction to one or more devices to perform the corresponding action. For example, a gesture by a user cupping a hand to an ear may constitute a command to play music. An image sensor 222 on the front-panel module 202 may recognize the gesture as a predefined gesture, and may cause a speaker to play music.

In various examples, the front-panel module 202 may include one or more speakers to provide an audio presentation. In such examples, the speakers may receive an audio signal from the local and/or remote computing devices based on a command. For example, the weather forecast requested in the example above may be provided in whole or in part as an audio presentation through the one or more speakers.

In some examples, the front-panel module 202 may include an external device port, such as a USB port, UART port, etc. The external device port may be configured to receive various external devices, such as an additional front-panel module 202, a speaker, a camera, a storage device (e.g., flash drive, external hard drive, solid state drives, etc.), a display, and the like.

Figure 2B:
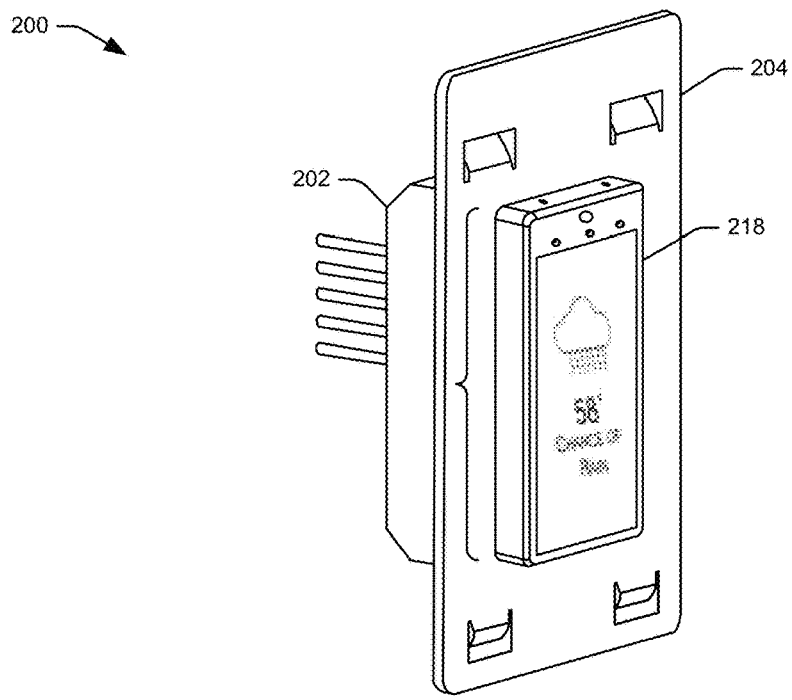

FIG. 2B illustrates another perspective view of an example front-panel module 204 and an example power unit 202 combined to form a voice-enabled modular device 200 where a display 218 of the front-panel module is powered on. In the illustrated example, the display 218 is presented weather information. In such examples, the speakers 220 may have detected a voice command 106 of the user 104 to display weather information, and the front-panel module 202 may have receive (e.g., from the remote system 128) data, or a command, indicating that the voice command is requesting the front-panel module 202 perform an operation of displaying weather information. Responsive to receiving an indication that the voice command 106 represented a request to display weather information, the front-panel module 202 may present weather information on the display 218 of the voice-enabled modular device 200.

Although the display 218 is illustrated as being a smaller display 218, in some examples the display 218 may be any size of display (e.g., television 110). The mechanical attachments of the power unit 204 and the front-panel module 202 may be strong enough to support a large display 218. Further, the power unit 204 may be capable of providing large enough amounts of power (e.g., 100 Watts, 400 Watts, etc.) at different voltages (e.g., 120 VAC, 220 VAC, etc.) to support a large display 218.

Figure 3:
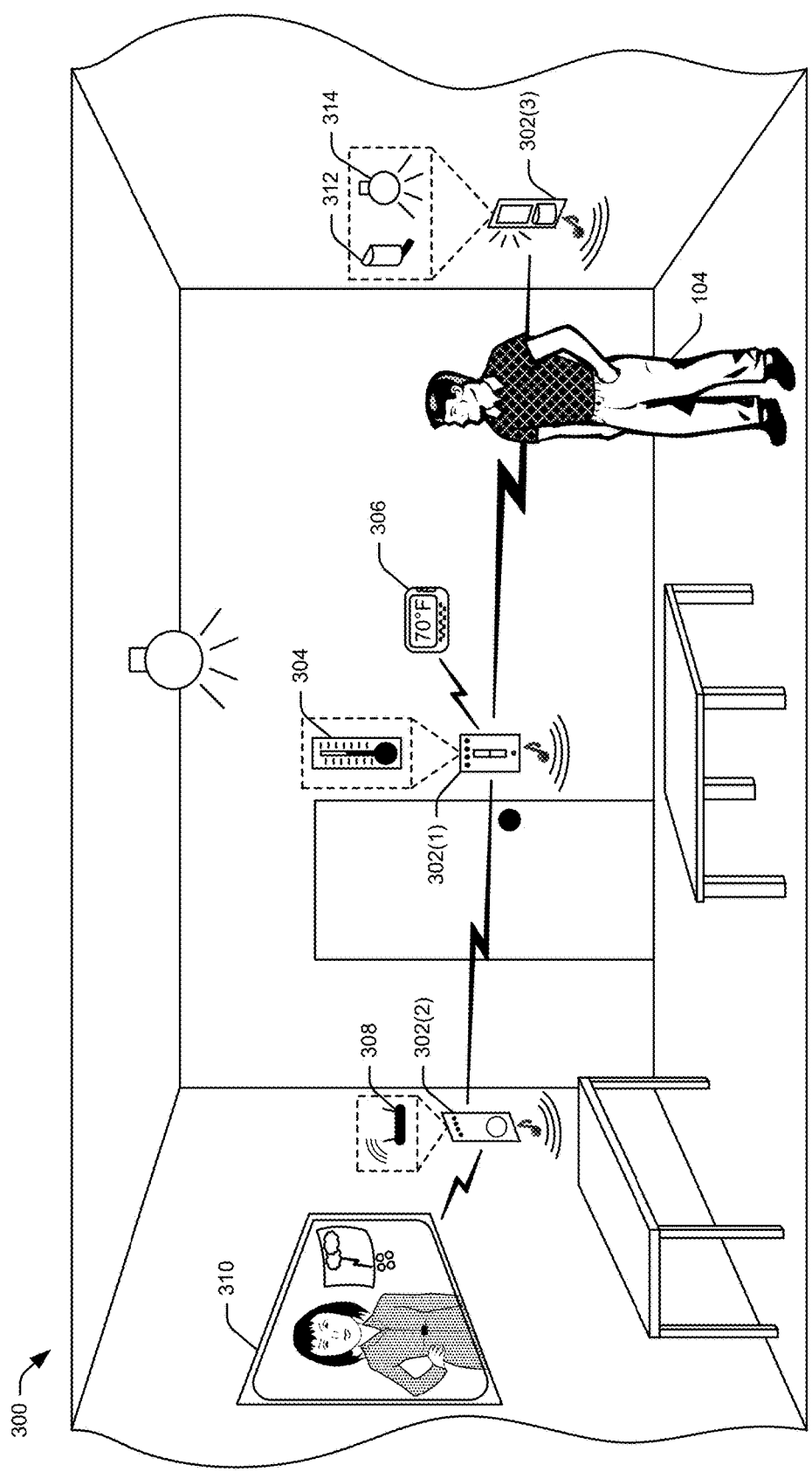
FIG. 3 shows another illustrative voice-interaction computing architecture set in another home environment. The architecture includes multiple voice-enabled modular devices controlling secondary devices physically situated in the home, along with a user. In this example, the voice-enabled modular devices include various types of input/output (I/O) mechanisms and communicate with various types of secondary devices illustrated in the room.

FIG. 3 shows another illustrative voice-interaction computing architecture set in another home environment 300. The architecture includes multiple voice-enabled modular devices 302 (e.g., voice-enabled modular device 108) controlling secondary devices physically situated in the home environment 300, along with a user 104. In this example, the voice-enabled modular devices (e.g., device 302(1), 302(2), and 302(2)) include various types of input/output (I/O) mechanisms and communicate with various types of secondary devices illustrated in the room.

As shown, one of the voice-enabled modular devices 302(1) includes a temperature sensor 304 to collect temperature data indicating a temperature in the home environment 300. In the illustrated example, the voice-enabled modular device 302(1) may include software components and/or hardware components that provide the voice-enabled modular device 302(1) with thermostat functionality. For instance, the voice-enabled modular device 302(1) may determine that a temperature in the house environment 300 is too low, or too high, compared to a temperature set by the user 104. In such an example, the voice-enabled modular device 302(1) may cause its associated power unit to turn on or off a cooling system or heating system. For instance, the power unit may control a heating system, or a cooling system as a load, and adjust (e.g., turn up, turn down, turn on, turn off, etc.) the power to the cooling/heating systems. In other examples, the voice-enabled modular device 302(1) may transmit a control signal to a thermostat device 306 (or another device associated with a heating system or cooling system) to cause the thermostat device 306 to control a heating system or cooling system accordingly to adjust for differences between the current temperature and a desired temperature.

In some examples, another voice-enabled modular device 302(2) in the environment may comprise, or include, a wireless-network device 308, such as a wireless-network booster or extender, a router, etc. The power unit of the voice-enabled modular device 302(2) may provide appropriate power to the wireless-network device 208 that is included in the front-panel module of the voice-enabled modular device 302(2) to transmit, or re-broadcast, a wireless-network connection. The wireless-network connection may be utilized by devices, such as the television 310, to stream audio and/or video data from online sources. Thus, rather than using a cable (e.g., HDMI), the voice-enabled modular device 302(2) that has the wireless-network device 308 may re-broadcast a wireless-network connection to enable steaming of data by the television 310, and other devices.

Further, the home environment 300 may include another voice-enabled modular device 302(3), which may comprise one or more front-panel modules that have a motion sensor 312 (or other presence detection sensor) and a light 314. In one example, the voice-enabled modular device 302(3) may include one front-panel module that has the motion detector 312, and another front-panel module that has the light 314. In such an example, the two front-panels of the voice-enabled modular device 302(3) may communicate to provide additional functionality for the voice-enabled modular device 302(3). For instance, the front-panel module with the motion sensor 312 may indicate to the front-panel module with the light 314 that motion was detected (e.g., the user 104 moved), and the front-panel module with the light 314 may turn on, or increase the brightness, of the light 314. Thus, the voice-enabled modular device 302(3) may be provided with nightlight functionality and/or motion-detector light functionality.

In various examples, the user 104 may have issued a voice command for the voice-enabled modular devices 302 to output audio data. In some examples, only one of the voice-enabled modular devices 302 may have detected the voice command. However, the voice-enabled modular devices 302 may be communicatively coupled to each other, such as through a wired or wireless network. Further, the voice-enabled modular devices 302 may include software components to facilitate synchronized output of audio data. In this way, each of the voice-enabled modular devices 302 may output the audio data using their respective speakers, providing a surround sound for the user 104 in the home environment 300.

FIG. 4A shows another illustrative voice-interaction computing architecture set in another home environment 400. The architecture includes a voice-enabled modular device 402 having a camera, where the voice-enabled modular device 402 controls secondary devices physically situated in the home environment 400 based on identifying a user 404.

In some examples, a voice-enabled modular device 402 having a camera, or other image sensor, may be utilized to perform additional functionality beyond capturing video data for video conferencing. For example, the voice-enabled modular device 402 may be configured with software and/or hardware components to perform user recognition techniques. In the example illustrated, the voice-enabled modular device 402 having the camera may capture video data or image data at a position 404 where the user's face is located. In some examples, the voice-enabled modular device 402 may begin to capture the video/image data responsive to a voice command of the user 104. For instance, the user may issue a voice command of "please open the door," and the voice-enabled modular device 402 may begin obtaining the image/video data for use in user recognition. The components of the voice-enabled modular device 402 may analyze the image/video data including the face of the user 104, and utilize various techniques to determine if the user is a recognized, or authorized user, who should be granted access to the home environment 400. For instance, the voice-enabled modular device 402 may perform iris scanning, facial recognition, or any other techniques to identify the user. If the identity of the user is associated with an authorized account of a security system of the home 400, then the voice-enabled modular device 402 may control various secondary devices. For instance, the voice-enabled modular device 402 may cause a door lock 406 to unlock to allow the user 104 to enter the home 400. Additionally, or alternatively, the voice-enabled modular device 402 may cause a security system device 408 to disable or disarm a security system of the house environment 400 to allow the user 104 to enter.

In some examples, the voice-enabled modular device 402 may include multiple front-panel modules. For instance, a base front-panel module may include microphones and network interfaces to facilitate speech processing (e.g., communicate with the remote system 128). An add-on front-panel module may include the camera to capture the image/video data, and be communicatively coupled to the base front-panel module to provide the image/video data for processing, or provide an indication to the base front-panel module that the user 104 is recognized. Accordingly, a voice-enabled modular device 402 may include one or more front-panel modules to facilitate user recognition using a camera or other imaging device, which may be used for security purposes (in addition to other purposes described herein, such as video conferencing).

FIG. 4B illustrates a side-view of an example voice-enabled modular device 402 having a camera 410 mounted on the front-panel module 412 of the voice-enabled modular device 402. The front-panel module 412 may be detachably coupled to a power unit 414, where the power unit 414 includes one or more power modules to provide power to the front-panel module 412. As illustrated, the camera 410 shown in FIG. 4B may be mounted onto the front-panel module 412 using an attachment mechanism 416. The attachment mechanism 416 may detachably couple the camera 410 to the front of the front-panel module 412, or may be formed as part of the front-panel module 412. In some examples, the attachment mechanism 416 may keep the camera 410 in a fixed position, while in other examples, the attachment mechanism 416 may allow the camera 410 to be adjusted, or rotated, along one or more axis.

FIG. 4C illustrates a side-view of another example voice-enabled modular device 402 having a camera 410 mounted with a moveable member 418 attached to, or part of, the front-panel module 412 of the voice-enabled modular device 402. As illustrated, the moveable member 418 may allow the user 104 to move the camera 410 around to different positions to capture image/video data of different portions of an environment of the user 104. Further, because the power unit 414 of the voice-enabled modular device 402 is installed in or on a wall or other surface, the front-panel module 412 may be able to support the weight of the moveable member 418 for the camera 410.

Although FIGS. 4B and 4C illustrate a camera 410 mounted on the front-panel device 412 of the voice-enabled modular device 402, any component described herein as being included or associated with a voice-enabled modular device (e.g., voice-enabled modular device 108) may be utilized with the moveable member 418 and/or the attachment mechanism 416.

FIG. 5 illustrates an example power unit 500 (e.g., power unit 116, power unit 204, power unit 414, etc.) having an example housing 502 for a multi-gang power unit 500 including multiple power modules 504(1) and 504(2).

In various examples, the two-gang power unit 500 can include a first power module 504(1) and a second power module 504(2). Each of the first power module 504(1) and the second power module 504(2) may be configured to transfer electrical power and/or data to one or more front-panel modules. The housing 502 may include mounting brackets 506. The mounting brackets 506 may comprise a metal material, a plastic material, a composite material, and/or other material capable of mounting to a surface. The mounting brackets 506 may be configured to mount the first power module 504(1) and the second power module 504(2) to a wall or other substantially flat surface (e.g., an imperfect wall/surface). In various examples, the mounting brackets 506 may be configured to mount the respective power modules 504 without relying on a surface flatness for proper alignment. The mounting brackets 506 may include through-holes 508 for fasteners (e.g., screws, nails, etc.) to mount the housing 502 to a surface using the mounting brackets 506.

In various examples, the first power module 504(1) and the second power module 504(2) may be recessed into a wall or other substantially flat surface. The respective power modules 504 may then be coupled to the housing 500, which may include the mounting brackets 506, via one or more attachment fasteners 510. The attachment fasteners 510 can be any type of fastener, including but not limited to snap-fit fasteners, screw fasteners, spring fasteners, snap-fit connectors, magnets, hook and loop connectors, or the like.

The power unit 500 may further include one or more alignment holes 512 to mate with alignment pins in respective front-panel modules for each of the power modules 504. In the illustrative example, the alignment holes 512 are configured to couple to alignment pins in opposite corners of the respective front-panel modules. In other examples, the alignment holes 512 may be configured to couple to the respective front-panel modules at any location (e.g., center, corners, top, bottom, etc.) to facilitate alignment of the power modules 504 with their respective front-panel modules.

In some examples, the alignment holes 512 may be used by the power unit 500 to determine whether a front-panel module has been connected to a power module 504. For instance, the power unit 500 may have mechanical and/or electrical sensors to detect whether the alignment holes 512 have mated with an alignment pin of a front-panel module. If the power unit 500 determines that the alignment holes 512 are mated with alignment pins of the front-panel module, the power unit 500 may being providing power for the front-panel module using a respective power module 504.

Each power module 504 may include respective connectors 514(1) and 514(2) to provide power to a front-panel module and/or for data communication. In such examples, the first connector 514 (1) and the second connector 514 (2) may couple to one or more front-panel modules. For example, the first power module 504(1) and the second power module 504(2) may couple to a single front-panel module. Each of connectors 514(1) and 514(2) may provide power and/or data to a base front-panel module, which may in turn provide power to an add-on front-panel power module connected to the base front-panel module. In some examples, the connectors 514(1) and 514(2) may provide power at different voltages, or in different forms. In some examples, the first power connector 514(1) may provide first power from the first power module 504(1) to a first front-panel module, and the second power connector 514(2) may provide second power from the second power module 504(2) to a second front-panel module.

Although FIG. 5 illustrates a power unit 500 with two power modules 504, the power unit 500 may include any number of power modules 504 arranged or positioned in any arrangement. In some examples, the power unit 500 may utilize each power module 504 to supply respective front-panel modules. However, in some examples, multiple power modules 504 may be utilized to provide power to a same front-panel module. For example, a front-panel module may include electrical connections to connect to both power modules 504(1) and 504(2) to receive power from each of the power modules 504(1) and 504(2) at different, or the same, voltages. In this way, the front-panel module may receive additional power, which may be helpful for more power-hungry front-panel modules.

Figure 6:
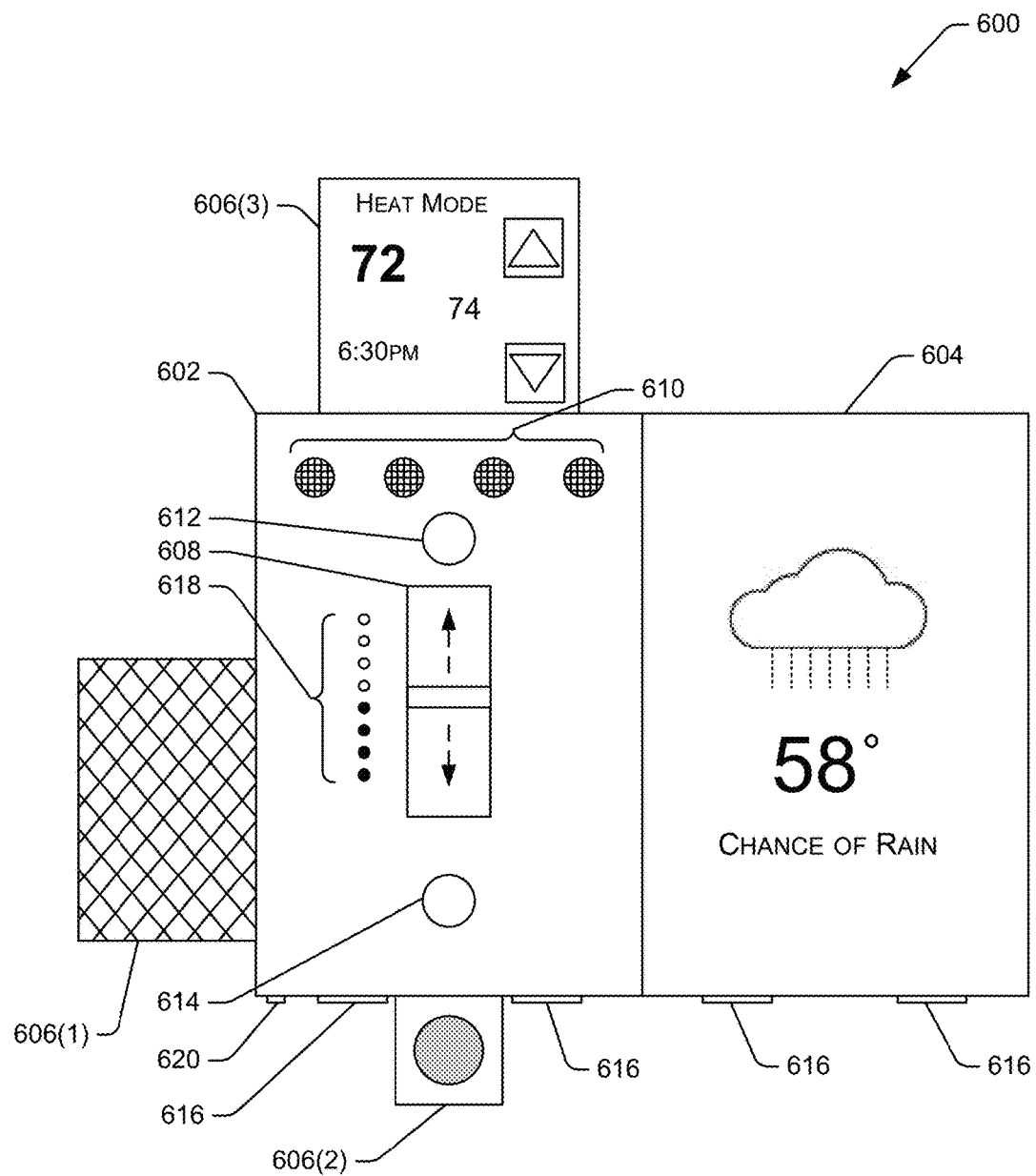
FIG. 6 illustrates a front view of an example voice-enabled modular device having a multi-gang power unit. In this example, the voice-enabled modular device includes a first front panel and a second front panel, each with different functionality.

FIG. 6 illustrates a front view of an example voice-enabled modular device 600 having a multi-gang power unit. In this example, the voice-enabled modular device 600 includes a first front-panel module 602 and a second front-panel module 604, each with different functionality.

In various examples, the first front-panel module 602 and the second front-panel module 604 may be connected to a single power unit, such as power unit 116, and may be configured to receive power from and/or transmit to and receive data from the power unit. In some examples, the first front-panel module 602 may be operably connected to a first power module of the power unit, and the second front-panel module 604 may be operably connected to a second power module of the power unit.

In various examples, a first power module and the second power module corresponding to the first front-panel module 602 and the second front-panel module 604, respectively, may be coupled to a common housing of the power unit, such as housing 502. In various examples, the first front-panel module 602 may be mechanically connected to the second front-panel module 604, or vice-versa. In such examples, the first front-panel module 602 and/or the second front-panel module 604 may include mechanical connectors (e.g., screw fasteners, spring fasteners, snap-fit connectors, magnets, hook and loop connectors, etc.). In some examples, the first front-panel module 602 and the second front-panel module 604 may be independent modules (e.g., separate front-panel modules) mounted substantially adjacent to one another. In the illustrative example, the first front-panel module 602 and the second front-panel module 604 are mounted so that respective sides of the first front-panel module 602 and second front-panel module 604 are touching. In other examples, the first front-panel module 602 and the second front-panel module 604 may be mounted so that respective sides are spaced a distance apart from one another.

In various examples, the first front-panel module 602 may be operably coupled to the second front-panel module 604. In some examples, first front-panel module 602 and the second front-panel module 604 may be configured to receive commands and cause one or more devices to perform operations. In such examples, the first front-panel module 602 and the second front-panel module 604 may be configured to process pre-defined commands. The pre-defined commands (e.g., sets of commands) may include types of commands (e.g., voice, gesture, touch, presence, etc.), devices associated with the commands (e.g., speaker, display, light, etc.), and/or capabilities of the respective front-panel modules (e.g., front-panel module with display configured to process commands associated with a presentation of information). In some examples, the first front-panel module 602 and the second front-panel module 604 may identify a command of a respective set of commands based on one or more pre-defined wakewords (e.g., first word in a command). For example, the first front-panel module 602 may be configured to identify a wakeword "weather" preceding a command. Based on an identification of the word "weather," the first front-panel module 602 may process the corresponding command. In various examples, the first front-panel module 602 and/or the second front-panel module 604 may identify a command of a respective set of commands based on one or more keywords in the command. In such examples, the first front-panel module 602 and the second front-panel module 604 may pre-process a command to identify the one or more keywords. Based on an identification of a keyword, the respective front-panel module may perform speech processing on the command and/or may send the command to a remote computing device for speech processing. For example, the first front-panel module 602 may be configured to receive speech commands and the second front-panel module 604 may be configured to receive gesture commands and/or touch commands. For another example, the first front-panel module 602 may be configured to process commands directed to a first group of devices, such as lights and speakers, and the second front-panel module 604 may be configured to process commands directed to a second group of devices, such as commands related to Internet searches and displays of information related to said searches In some examples, the first front-panel module 602 may be configured to detect voice commands, process the voice commands, and cause the second front-panel module 604 to perform operations based on the commands. In such examples, the first front-panel module 602 may be designated as a base front-panel module to act, at least partially, on behalf of the second front-panel module 604.

In various examples, a front-panel module, such as the first front-panel module 602 or the second front-panel module 604, may be configured as a central control unit and may receive commands and cause one or more devices to perform operations. In such examples, the front-panel module may include one or more external device ports, such as an external USB port, configured to provide power and/or data commands to one or more detachably coupled external devices. In the illustrative example, the external devices 606(1), 606(2), and 606(3) may be coupled to the first front-panel module 602, which may act as the central control unit. In such an example, the external devices 606(1) (illustrated as a speaker), 606(2) (illustrated as a camera), and 606(3) (illustrated as a display presenting thermostat data), may present information based on control signals generated by a computing system of first front-panel module 602 or a remote computing device, responsive to commands from the user. Though the external devices 606(1), 606(2), and 606(3) are illustrated as a speaker, camera, and display, respectively, it is understood that the external devices 606 may include any type of device (e.g., mobile telephone, tablet, speaker, display, camera or other sensor, touch input device, etc.) configured to connect via the one or more external device ports. Further, the external devices 606(1), 606(2), and 606(3) may include all, or some, of the functionality of a front-panel module (e.g., microphones to detect speech, speech-processing components, network interfaces to communicate, etc.).

The external devices 606 configured to couple to the front-panel module via an external device port may comprise input and/or output devices, depending on respective device settings. For example, the external device 606(3) can include a computing device configured in a thermostat setting. In the thermostat setting, the external device 606(3) may include a touch screen input to increase and/or decrease the temperature setting. The input received via the touch screen may be transmitted to the front-panel module via the external device port, for further processing (e.g., sending a control signal to a heater to turn on). For another example, the user may issue a command to the front-panel module to change the external device 606(3) setting from a thermostat setting to a security system setting. Responsive to the command, the front-panel module 602 may send a signal to the external device 606(3) to change settings. In the security screen setting, the external device 606(3) may be configured to present data, such as streaming video data from one or more security cameras.

In some examples, the second front-panel module 604 may comprise an external device that is coupled to an external port of the first front-panel module 602. For example, a first front-panel module 602 may be configured as a central control unit and may receive commands to present a weather forecast and thermostat (e.g., temperature of the home environment) data. Responsive to the commands, the first front-panel module 602 may send a first control signal to the second front-panel module 604 to cause the display to present the weather forecast, and a second control signal to the external device 606(3) to present thermostat data.

As described above with regard to FIG. 1, the first front-panel module 602 and/or the second front-panel module 604 may include a number of input and/or output devices. As shown in FIG. 6, the first front-panel module 602 may include a mechanical switch 608, a microphone array 610, a sensor 612, a mute button 614, speakers 616, a level indicator 618, and a reset switch 620.

The level indicator 618 may provide a visual indication of a level of output (e.g., volume of a speaker, brightness of a light, etc.) of one or more devices. In various examples, the level indicator 618 may be configured to continually present the level of output of a single device. In such examples, one or more lights on the level indicator 618 may illuminate to illustrate a level of output of the single device. For example, the level indicator 618 may represent a volume of the one or more speakers 616.

The reset switch 620 may be configured to temporarily remove and restore power (e.g., reboot a computing system of a front-panel module) to the first front-panel module 602 and/or the second front-panel module 604. The reset switch 620 may comprise a button, a toggle switch, or other mechanical device configured to remove and restore power to the front-panel modules 602 and/or 604. In some examples, the first front-panel module 602 and/or the second front-panel module 604 of the voice-enabled modular device 600 may include a disconnect switch configured to rapidly remove power and/or a data connection from the first front-panel module 602 and/or the second front-panel module 604. Additionally, or alternatively, the disconnect switch may be configured to remove power and/or a data connection from one or more power units coupled to the voice-enabled modular device 600.

In various examples, the second front-panel module 604 may include a reset and/or disconnect switch configured to perform the respective functions on the second front-panel module 604 when activated. In such examples, respective reset and/or disconnect switches may be activated to reset and/or disconnect power to respective front-panel modules. For example, activation of a reset button on the second front-panel module 602 may cause a reboot of a computing system driving the second front-panel module 604.

As illustrated, the second front-panel module 604 may include a display for presenting information. The display may be a light-emitting diode (LED) display, an organic light-emitting diode (OLED) display, an active-matrix OLED a thin film transistor (TFT) display, a thin film diode (TFD) display, color super twisted nematic (CSTN) display, a quantum dot display, an electronic ink (E-ink) display, carbon nanotubes, or any other type of display. In various examples, the display may be configured to receive touch input, such as through a capacitive touchscreen or a resistive touchscreen. Additionally, or alternatively, the second front-panel module 604 may include one or more other components, such as one or more speakers 614, a mute button, a microphone array, one or more sensors, an external drive port, a mechanical switch, a level indicator, and the like.

Figure 7:
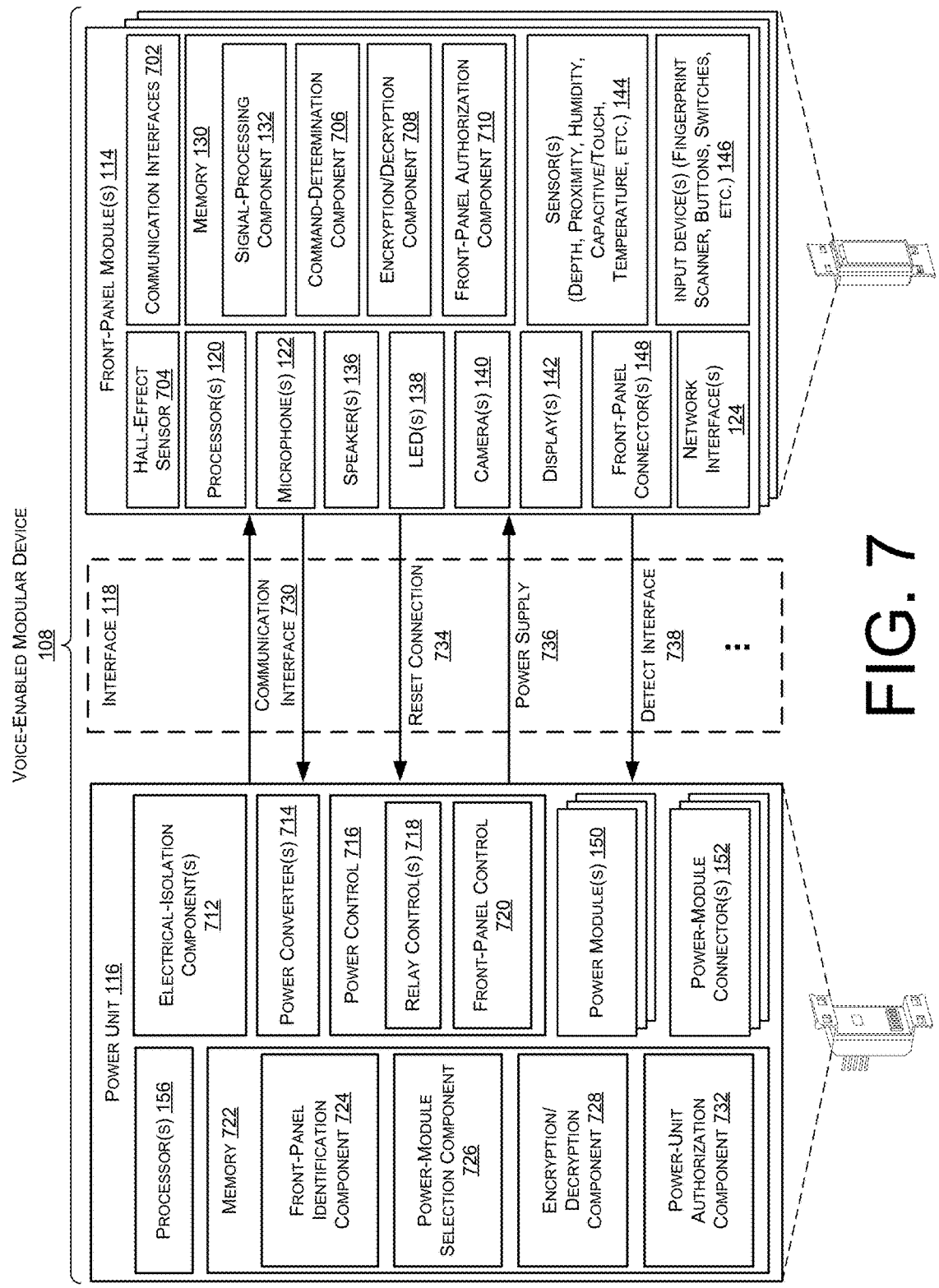
FIG. 7 illustrates an example configuration of components of a voice-enabled modular device.

FIG. 7 illustrates an example configuration of components of a voice-enabled modular device 108. As illustrated, the components of FIG. 7 that have the same numbering as those of FIG. 1 carry the same description, function, and/or meaning as the description of FIG. 1. In some examples, the front-panel module(s) 114 may include one or more communication interfaces 702, such as USB, UART, SPI, or any other communication interface for communicatively coupling with another device, such as a secondary front-panel module 114. The front-panel module(s) 114 may further include a hall-effect sensor 704, which may be used by the power unit 116 to determine that the front-panel module 114 is in contact with the power unit 116. In some examples, the communication interfaces 702 may comprise wireless communication interfaces (e.g., short range wireless communication interfaces). In this way, multiple front-panel modules 114 may communicate with each other using wireless communication interfaces.

The memory 130 of the front-panel module 114 may store various components, such as a command-determination component 706, an encryption/decryption component 708, and a front-panel authorization component 710. In various examples, the command-determination component 706 may comprise instructions for determining a command to be performed based on speech input, and/or what device to send the command based on the input received at the front-panel module 114. For instance, the microphones 122 may receive the voice command 106 from a user 104, and send audio signals to the remote system 128 for processing. The front-panel module 114 may receive, via the network interfaces 124 (e.g., one or more antennas), data indicating that the audio signals included a request for a device to perform an operation. Thus, the command-determination component 706 may determine a device to perform the command (e.g., the front-panel module 114 itself, an add-on front-panel module 114, secondary devices, etc.) and/or generate a command to cause the respective device to perform the operation. In other examples, the front-panel module 114 may receive input via the various components (e.g., camera 140, depth sensor 144, proximity sensor 144, capacitive sensor 144, input devices 146, etc.), or from components of an add-on front-panel module 114. The command-determination component 706 may determine, based on the input received, a command to cause an appropriate device to perform the operation. As an example, if the operation to be performed is to turn on a display, a device that has a display may be selected to perform the operation. Thus, the command-determination component 706 may determine which device to perform the operation based on device capabilities, device names, or other data.

The encryption/decryption component 706 may encrypt data sent to the power unit 116, and decrypt data received from the power unit 116, using one or more encryption keys. The encryption/decryption component 706 may encrypt the data to generate encrypted data prior to sending data over the interface 118. The encryption/decryption component 706 may be utilized by the front-panel authorization component 710. The front-panel authorization component 710 may perform various communications with the power unit 116 to provide that the front-panel module 114 is an authentic, or otherwise valid, front-panel module 114. Further description of the operations performed by the front-panel authorization component 710 may be found with respect to FIG. 10.

The power unit 116 may include one or more electrical-isolation components 712 to electrically isolate the power unit 116 from the interface 118. In some examples, the electrical-isolation components 712 may include a magnetic isolation component that includes a circuit including a transformer to magnetically isolate the power unit 116 from the connections exterior the power unit 116. Additionally, or alternatively, the electrical-isolation components 712 may include an optical isolation component to provide electrical isolation using any known optical isolation technique. However, the electrical-isolation components 712 may include any type of electrical isolation component between the power unit 116 and the interface 118 to allow for the power unit 116 to be "hot pluggable," or safe to unplug a powered front-panel module 114.

The power unit 116 may further include one or more power converters 714 to convert power from various voltages and/or forms into different voltages and/or forms to power components of the power unit 116 and to supply the front-panel module 114 with power at different voltages. Further, the power unit 116 may include a power control 716 that includes a relay control 718 and a front-panel control 718. The relay control 718 may be configured to detect that a front-panel module 114 is in proximity to the power unit 116, and the power unit 116 may being providing power to the front-panel module 114 upon the relay control 716 detecting the front-panel module 114 in proximity. For instance, the relay control 718 may detect the hall-effect sensor 704 of the front-panel module 114. The front-panel control 720 may control the power provide to the front-panel module 114. For instance, the front-panel control 720 may determine how much power to provide to a front-panel module 114, and may further determine a voltage at which to provide the power to the front-panel module 114.

The power unit 116 may include memory 722 including various components that are powered by the processor(s) 156. The memory 722 may include a front-panel identification component 724 which determines a type of the front-panel module 114 connected to the power unit 116. For instance, the front-panel identification component 724 may determine a type and/or capabilities of the front-panel module 114 being connected to the power unit 116. In some examples, the front-panel identification component 724 may determine the type of the front-panel module 114 based on an RFID emitted by the front-panel module 114.

The memory 722 may store a power-module selection component 726 to determine which power module 150 to utilize to provide power to a particular front-panel module 114. For instance, based on the type of front-panel module 114, the power-module selection component 726 may determine a power module 150 to provide power to the front-panel module 114 at an appropriate voltage.

The memory 722 may also include an encryption/decryption component 728 to encrypt data sent to the front-panel module 114, and decrypt data received from the front-panel module 114, using one or more encryption keys. The encryption/decryption component 728 may encrypt data to generate encrypted data prior to sending data over the interface 118. The encryption/decryption component 728 may be utilized by the power-unit authorization component 732. The power-unit authorization component 732 may perform various communications with the front-panel module 114 to determine that the front-panel module 114 is an authentic, or otherwise valid, front-panel module 114. Further description of the operations performed by the power-unit authorization component 732 may be found with respect to FIG. 10.

The interface 118 may include various wires or connections, including a communication interface 730, a reset connection 734, a power supply 736, and a detect interface 738. The communication interface 730 may comprise two connections facilitating communications between the front-panel module 114 and the power unit 116. While the interface 118 is illustrated as having two connections for communications using the I2C protocol, in some examples the interface 118 may comprise any number of hardwired connections (e.g., 1, 2, 3, 4, 5, etc.) used to communicate using different protocols (e.g., UART, SPI, USB, I2C, etc.).

The reset connection 734 may comprise a wire, or other type of hardware connection, which has a logic high/low signal placed on it that, when detected by the power unit 116, cause the power unit 116 and/or processor(s) 156 to reset. The power supply 736 may be utilized to provide power to a front-panel module 114. The detect interface 738 may be utilized to determine whether or not the front-panel module 114 is connected to the power unit 116 or not. Based on a logic low or high signal placed on the detect interface 738, the power unit 116 may selectively provide power to a front-panel module 114.

In some examples, each power module 150 providing power to a respective front-panel module 114 may utilize an interface 118. Stated otherwise, each power module 150 may include, or utilize, a respective interface 18 to communicate and/or power a front-panel module 114.

Figure 8:
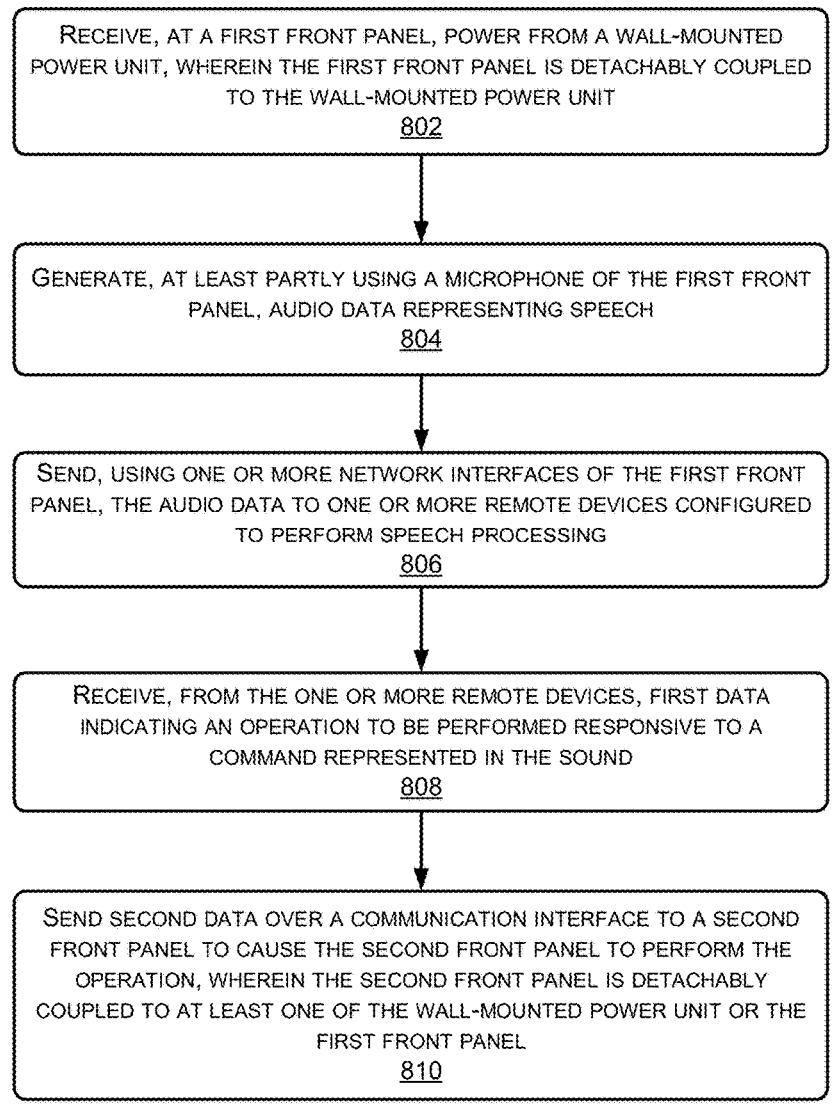
FIG. 8 illustrates an example flow diagram of an example process for a first front panel a voice-enabled modular device controlling operations of a second front panel of the voice-enabled modular device based on speech from a user.
Figure 9:
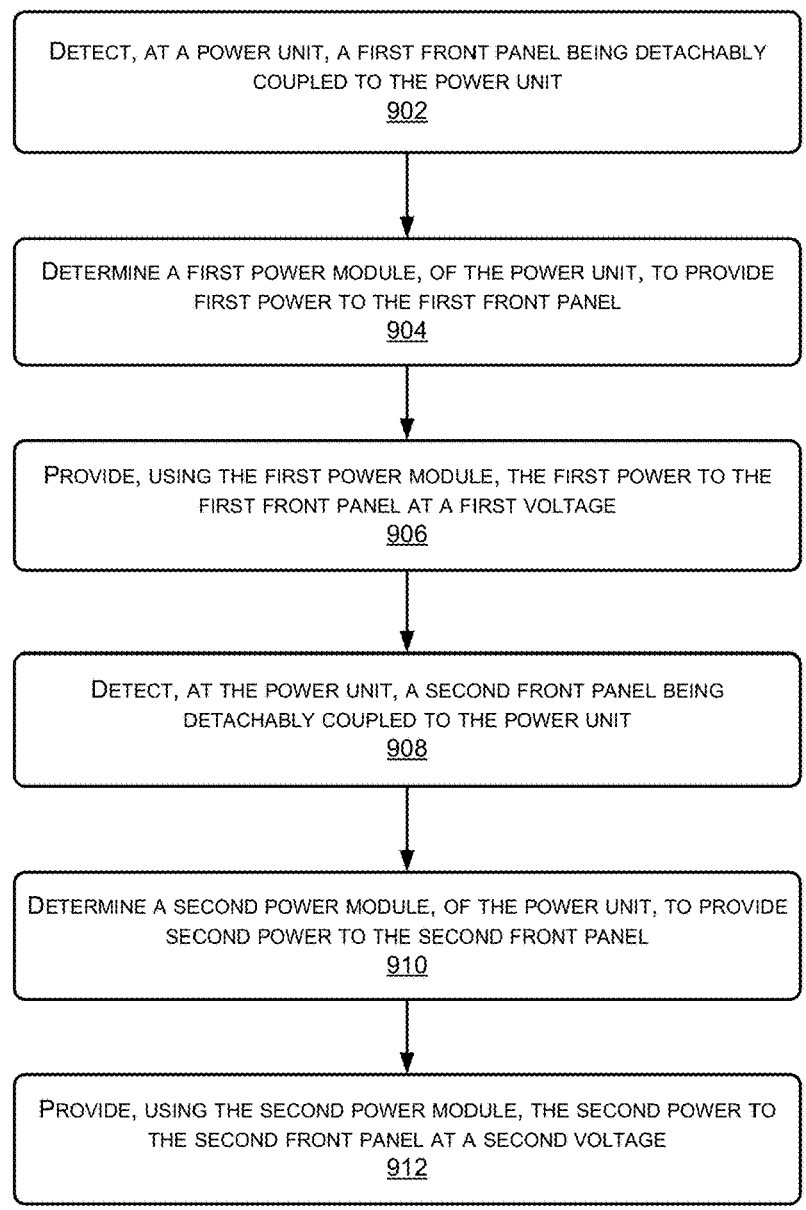
FIG. 9 illustrates an example flow diagram of an example process for utilizing two power modules of a power unit to provide power to two front panels of a voice-enabled modular device.
Figure 10:
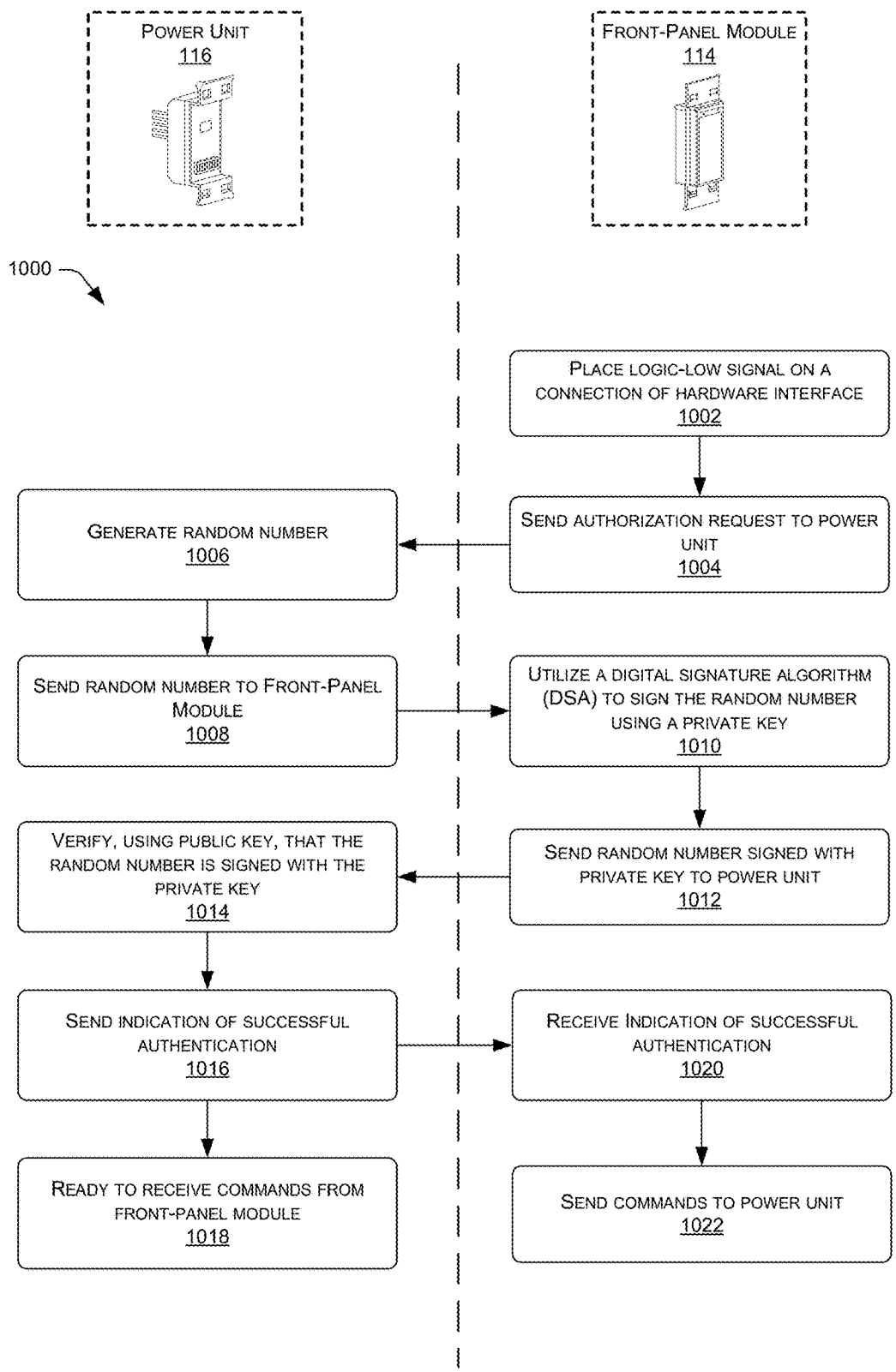
FIG. 10 illustrates an example flow diagram of an example process performed by a power unit and a front-panel module of a voice-enabled modular device to authenticate a front-panel module.

FIGS. 8-10 illustrate flow diagrams of example processes/methods 800, 900, and 1000. These processes (as well as each process or method described herein,) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 8 illustrates an example flow diagram of an example process 800 for a first front panel a voice-enabled modular device controlling operations of a second front panel of the voice-enabled modular device based on speech from a user.

At 802, a first front panel (e.g., front-panel module 114) may receive power from a wall-mounted power unit (e.g., power unit 116). In some examples, the first front panel may be detachably coupled to the wall-mounted panel unit. For instance, the first front panel and/or the wall-mounted panel unit may one or more attachment mechanisms. In some examples, the first front panel may include one or more wires to electrically couple the first front panel to the wall-mounted power unit.

In some examples, the wall-mounted power unit may further provide power to a second front panel. The first front panel may be communicatively coupled to the first front panel to send and receive data, such as through a wired or wireless communication interface (e.g., 702). In such examples, the receiving, by the front panel, the power from the wall-mounted power unit may comprise receiving first power at a first voltage from a first power module of the wall-mounted power unit. Further, the second front panel may receive second power at a second voltage from a second power module of the wall-mounted power unit.

At 804, the first front panel may generate, at least partly using a microphone (e.g., microphone(s) 122) of the first front panel, audio data representing sound. For instance, the user 104 may have issued speech (e.g., voice command 106) in an environment of the first front panel (e.g., front-panel module(s) 114). In some examples, the sound may comprise noise other than speech. For instance, the sound may include a baby crying. In such examples, the speech-processing system may determine, based on the baby crying, to cause a device to perform a command. For instance, the command may be for the front-panel module to output audio notifying a user that the baby is crying, causing the front-panel module to play soothing music for the baby, etc. Thus, the sound may include speech, but may also include other noises.

At 806, the first front panel may send, using one or more network interfaces 124 of the first front panel, the audio data to one or more remote devices configured to perform speech processing (e.g., remote system 128).

At 808, the first front panel may receive, from the one or more remote devices, first data indicating an operation to be performed responsive to a command represented in the speech. Further, the first front panel may determine a device to perform the operation. For instance, a command-determination component 706 may determine a device to perform the operation. Selecting the device to perform the operation may be based on capabilities of the devices that are communicatively coupled to the first front panel. Such devices may include, for example, secondary devices that are not voice-enabled (e.g., television 110, light 112, etc.), or other front-panel modules that the first front panel is communicatively coupled to, such as the second front panel. The first front panel may determine that the operation is to be performed by the second front panel.

At 810, the first front panel may send second data over a wired or wireless communication interface (e.g., communication interfaces 702) to the second front panel to cause the second front panel to perform the operation. In some examples, the second front panel is detachably coupled to at least one of the wall-mounted power unit or the first front panel. In some examples, the first front panel comprises a light switch, and the second front panel comprises at least one of a display, a camera, a wireless-network extender, an iris scanner, or a speaker. In some examples, the second front panel may be electrically and/or mechanically coupled to the wall-mounted power unit. The second front panel may receive power from the wall-mounted power unit. In other examples, the second front panel may receive power from the first front panel, and be electrically coupled to the first front panel.

In examples where the second front panel includes a camera, the sending the second data to the second front panel may comprise sending an instruction to the second front panel to record video data using the camera. The process/method 800 may further comprise receiving, over the communication interface and from the second front panel, the video data, and sending, from the first front panel, the video data to a remote computing device (e.g., video conference).

In examples where the second front panel includes a display, the sending the second data to the second front panel comprises sending an instruction to the second front panel to output video data using the display. In such examples, the process/method 800 may further comprise receiving, from a remote computing device, the video data, and sending, from the first front panel, the video data to the second front panel (e.g., video conference, online streaming video, etc.)

In examples where the first front panel includes a first speaker, and the second front panel includes a second speaker, the sending the second data to the second front panel comprises sending an instruction to the second front panel to output audio data using the second microphone. In such examples, the process/method 800 may further comprise receiving, at the first front panel, the audio data from a remote computing device, sending, from the first front panel, the audio data to the second front panel, and synchronizing, by the first front panel, output of the audio data using the first speaker with output of the audio data by the second speaker. For example, at least one of the first front panel and/or the second front panel may include components to facilitate synchronized output of audio data using a speaker on each front panel.

FIG. 9 illustrates an example flow diagram of an example process 900 for utilizing two power modules (e.g., power module(s) 150) of a power unit (e.g., power unit 116) to provide power to two front panels of a voice-enabled modular device (e.g., front-panel module(s) 114).

At 902, the power unit 116 may detect a first front panel being detachably coupled to the power unit. At 904, the power unit 116 may determine a first power module, included in the power unit, to provide first power to the first front panel. At 906, the power unit may provide, using the first power module, the first power to the first front panel at a first voltage.

At 908, the power unit may detect a second front panel being detachable coupled to the power unit at 910, the power unit may determine a second power module included in the power unit to provide second power to the second front panel 910. At 912, the power unit may provide, using the second power module, the second power to the second front panel at a second voltage.

FIG. 10 illustrates an example flow diagram of an example process 1000 performed by a power unit 116 and a front-panel module 114 of a voice-enabled modular device 108 to authenticate a front-panel module 114. In some examples, the steps of process 100 may be performed using components of the front-panel module 114 and the power unit 1116, such as the encryption/decryption component 708, the front-panel authorization component 710, the encryption/decryption component 728, and the power-unit authorization component 732.

At 1002, the front-panel module 114 may place a logic-low signal on a connection of a hardware interface (e.g., interface 118). At 1004, the front-panel module 114 may send an authorization request to the power unit 116 using the interface 118. At 1006, the power unit 116 may generate a random number. For instance, the power unit 116 may detect the logic-low signal and received the authentication request, and generate the random number.

At 1008, the power unit 116 may send the random number to the front-panel module 114 over the interface 118. At 1010, the front-panel module 114 may receive the random number and utilize a digital signature algorithm (DSA) to sign the random number using a private key stored locally at the front-panel module 114. For instance, the front-panel module 114 may utilize an Elliptic Curve Digital Signature Authentication (ECDSA) using P-224 curve on the random number sent by the power unit 116.

At 1012, the front-panel module 114 may send the random number signed with the private key to the power unit 116. At 1014, the power unit may verify, using a public key, that the random number is signed with the private key. At 1016, the power unit 116 may send an indication of successful authentication to the front-panel module 114. Further, upon determining successful authentication of the front-panel module 114, the power unit 116 may, at 1018, prepare, or be ready, to receive commands from the front-panel module 114.

At 1020, the front-panel module 114 may receive the indication of successful authentication from the power unit 116. At 1022, the front-panel module 114 may send commands to the power unit to perform various operations, such as controlling a power load of the power unit 116.

As used herein, a processor, such as processor(s) 120, 156, and/or 160 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 1120, 156, and/or 160 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 120, 156, and/or 160 may possess its own local memory, which also may store program components, program data, and/or one or more operating systems.

As described herein, computer-readable media and/or memory 130, 162, and/or 722 may include volatile and nonvolatile memory, removable and non-removable media implemented in any method or technology for storage of information, such as computer-readable instructions, data structures, program component, or other data. Such computer-readable media and/or memory 130, 162, and/or 722 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 120, 156, and/or 160 to execute instructions stored on the computer-readable media and/or memory 130, 162, and/or 722. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 130, 162, and/or 722, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 124 may enable communications between the voice-enabled modular devices 108 and the remote system 128, as well as other networked devices. Such network interface(s) can include one or more network interface controllers (NICs) or other types of transceiver devices to send and receive communications over a network.

For instance, the network interface(s) 124 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 124 may include a wide area network (WAN) component to enable communication over a wide area network. The network 126 may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An apparatus having a first surface and an opposing second surface, the apparatus comprising:
  one or more wires connected to the apparatus and configured to electrically couple the apparatus to a wall-mounted power unit, wherein the wall-mounted power unit provides power to the apparatus;
  a first attachment mechanism disposed on the first surface and configured to detachably couple the apparatus to the wall-mounted power unit, wherein the one or more wires are configured to connect to the wall-mounted power unit;
  a second attachment mechanism disposed on the second surface and configured to detachably couple a secondary apparatus to the apparatus;
  a communication interface to communicatively couple the secondary apparatus to the apparatus;
  a microphone;
  a wireless network interface;
  one or more processors; and
  computer-readable media storing computer-executable instructions that, when executed by the one or more processors, cause the one or more processors to perform operations comprising:
    receiving speech input via the microphone, the speech input including information about an action;
    generating audio data representing the speech input;
    sending, via the wireless network interface, the audio data to one or more remote devices configured to perform speech processing;
    receiving, from the one or more remote devices and via the wireless network interface, first data corresponding to the action; and
    sending, based on the first data and using the communication interface, second data to the secondary apparatus to cause the secondary apparatus to perform the action.

2. The apparatus of claim 1, wherein:
the action includes recording video data; and
the operations further comprising:
  causing video data to be recorded using the secondary apparatus;
  receiving the video data from the secondary apparatus; and
  sending the video data to a remote computing device.

3. The apparatus of claim 1, wherein:
the second attachment mechanism is configured to detachably couple the apparatus to a mechanical member of the secondary apparatus; and
the mechanical member enables movement of the secondary apparatus relative to the apparatus.

4. The apparatus of claim 1, wherein:
the action includes outputting video data; and
the operations further comprising:
  receiving the video data from a remote device; and
  causing display of the video data on a display of the secondary apparatus.

5. The apparatus of claim 1, wherein:
the apparatus receives first power at a first voltage from a first power module of the wall-mounted power unit via the one or more wires; and
the secondary apparatus receives second power at a second voltage, different from the first voltage, from a second power module of the wall-mounted power unit.

6. The apparatus of claim 1, wherein:
the action includes outputting first audio data; and
the operations further comprising:
receiving the first audio data; and
sending the first audio data to the secondary apparatus, wherein the secondary apparatus outputs audible sound corresponding to the first audio data via a loudspeaker of the secondary apparatus.

7. The apparatus of claim 6, the operations further comprising synchronizing output of the audio data using the loudspeaker of the secondary apparatus with outputting of audible sound corresponding to the audio data via another loudspeaker of the apparatus.

8. A device having a first surface and an opposing second surface, the device comprising:
one or more wires connected to the device;
a first coupling mechanism disposed on the first surface to detachably couple the device to a wall-mounted power unit, wherein the wall-mounted power unit provides power to the device via the one or more wires;
a second coupling mechanism disposed on the second surface to detachably couple the device to a secondary device;
a wireless network interface;
a microphone;
one or more processors located inside the device; and
computer-readable media storing computer-executable instructions that, when executed by the one or more processors, cause the one or more processors to:
receive speech input via the microphone, the speech input including information about an action;
generate audio data representing the speech input;
send, via the wireless network interface, the audio data representing sound to one or more remote devices configured to perform speech processing;
receive, from the one or more remote devices and via the wireless network interface, first data corresponding to the action; and
send, based on the first data, second data to the secondary device to cause the secondary device to perform the action.

9. The device of claim 8, comprising further computer-executable instructions that, when executed by the one or more processors, cause the one or more processors to:
receive, from the secondary device, temperature data generated at least partly by a temperature sensor;
determine, based at least partly on the temperature data, that a temperature of an environment of the device is different than a target temperature; and
cause at least one of a heating system or a cooling system to activate.

10. The device of claim 8, further comprising:
one or more light emitting diodes (LEDs); and
further computer-executable instructions that, when executed by the one or more processors, cause the one or more processors to:
receive, from the secondary device, motion data generated at least partly by a motion sensor indicating that motion was detected in an environment of the device; and
cause the one or more LEDs of the device to turn on.

11. The device of claim 8, comprising further computer-executable instructions that, when executed by the one or more processors, cause the one or more processors to:
receive, from the secondary device, image data captured by a camera, the image data representing a face of a user;
analyze the image data to determine that the user is associated with an authorized user profile of a security system; and
send third data to a security device associated with the security system.

12. The device of claim 8, wherein:
the device receives first power at a first voltage from a first power module of the wall-mounted power unit; and
the secondary device receives second power at a second voltage from a second power module of the wall-mounted power unit, wherein the second voltage is different than the first voltage.

13. The device of claim 8, further comprising a hardware interface to couple the device to the wall-mounted power unit, the hardware interface including multiple connections; and
comprising further computer-executable instructions that, when executed by the one or more processors, cause the one or more processors to:
place a logic-low signal on at least one of the multiple connections of the hardware interface;
send, via the hardware interface, an authentication request to the wall-mounted power unit;
receive, via the hardware interface, a number generated by the wall-mounted power unit;
utilize a digital signature algorithm to sign the number to generate a signed number, wherein the number is signed using a private key stored in the device; and
send, via the hardware interface, the signed number to the wall-mounted power unit for verification by the wall-mounted power unit.

14. An apparatus having a first surface and an opposing second surface, the apparatus comprising:
one or more wires connected to the apparatus;
a first attachment mechanism disposed on the first surface and configured to detachably couple the apparatus to a wall-mounted power unit, wherein the wall-mounted power unit provides power to the apparatus via the one or more wires;
a communication interface to communicatively couple with a secondary apparatus;
a microphone;
one or more processors located inside the apparatus; and
computer-readable media storing computer-executable instructions that, when executed by the one or more processors, cause the one or more processors to:
receive speech input via the microphone, the speech input including information about an action;
generate audio data representing the speech input;
send the audio data to one or more remote devices;
receive from the one or more remote devices, first data corresponding to the action; and
send, based on the first data, second data to the secondary apparatus to cause the secondary apparatus to perform the action.

15. The apparatus of claim 14, wherein:
the action includes recording video data; and
comprising further computer-executable instructions that, when executed by the one or more processors, cause the one or more processors to:
receive, over the communication interface and from the secondary apparatus, the video data; and
send the video data to a remote computing device.

16. The apparatus of claim 14, further comprising a second attachment mechanism configured to detachably couple the secondary apparatus to the apparatus, wherein:

the second attachment mechanism is configured to detachably couple the apparatus to a mechanical member of the secondary apparatus; and the mechanical member enables movement of the secondary apparatus relative to the apparatus.

17. The apparatus of claim 14, wherein:

the apparatus receives first power at a first voltage from a first power module of the wall-mounted power unit; and the secondary apparatus receives second power at a second voltage, different from the first voltage, from a second power module of the wall-mounted power unit.

18. The apparatus of claim 14, wherein:

the action includes outputting audible sound represented by audio data; and comprising further computer-executable instructions that, when executed by the one or more processors, cause the one or more processors to:

receive, from a remote computing device, the audio data; and send the audio data to the secondary apparatus, wherein the secondary apparatus outputs the audible sound corresponding to the audio data via a loudspeaker of the secondary apparatus.

19. The apparatus of claim 18, comprising further computer-executable instructions that, when executed by the one or more processors, cause the one or more processors to synchronize output of audible sound corresponding to the audio data using the loudspeaker of the secondary apparatus with outputting of audible sound corresponding to the audio data via another loudspeaker of the apparatus.

* * * * *